United States Patent [19]

Iima

[11] Patent Number: 4,916,318
[45] Date of Patent: Apr. 10, 1990

[54] SCAN TYPE OPTICAL READER WITH CHANGING BEAM WAIST POSITION

[75] Inventor: Mitsunori Iima, Tokyo, Japan

[73] Assignee: Asahi Kogaku Kogyo K.K., Tokyo, Japan

[21] Appl. No.: 133,895

[22] Filed: Dec. 16, 1987

[30] Foreign Application Priority Data

| Dec. 16, 1986 | [JP] | Japan | 61-299675 |
| Dec. 16, 1986 | [JP] | Japan | 61-299676 |
| Dec. 19, 1986 | [JP] | Japan | 61-303206 |
| Dec. 22, 1986 | [JP] | Japan | 61-305947 |
| Feb. 26, 1987 | [JP] | Japan | 62-27861 |
| Apr. 22, 1987 | [JP] | Japan | 62-97593 |
| Sep. 17, 1987 | [JP] | Japan | 62-141787[U] |

[51] Int. Cl.$^4$ .......................... G06K 7/10; H01J 5/16
[52] U.S. Cl. .................................. 250/568; 250/236; 350/6.8
[58] Field of Search ............... 358/204, 205, 293, 294; 235/467, 470, 462, 472; 250/236, 235, 234, 568; 350/6.8, 6.7, 6.6, 6.5

[56] References Cited

U.S. PATENT DOCUMENTS

| Re. 16,789 | 11/1927 | Jenkins | 358/205 |
| 3,323,417 | 6/1967 | Grey et al. | 250/236 |
| 3,500,053 | 3/1970 | Calhoun | 250/236 |
| 3,555,280 | 1/1971 | Richards | 250/236 |
| 3,602,572 | 8/1971 | Norris, Jr. | 358/205 |
| 4,409,470 | 10/1983 | Shepard et al. | 235/472 |
| 4,560,862 | 12/1985 | Eastman et al. | 235/467 |
| 4,575,625 | 3/1986 | Knowles | 235/467 |
| 4,603,262 | 7/1986 | Eastman et al. | 250/566 |
| 4,678,288 | 7/1987 | Lonsdale et al. | 350/432 |
| 4,715,699 | 12/1987 | Morimoto | 350/6.8 |
| 4,742,220 | 5/1988 | Beyor | 250/568 |
| 4,775,205 | 10/1988 | Muramatsu | 350/6.5 |

Primary Examiner—David C. Nelms
Assistant Examiner—Michael Messinger
Attorney, Agent, or Firm—Sandler & Greenblum

[57] ABSTRACT

A scan-type optical reader having a laser source used for reading information on a subject such as, for example, a bar code. A deflecting optical member deflects a laser beam emitted from the laser source to the subject to be scanned. In the reader there is a projecting lens displaced between the laser source and the deflecting optical member. A light-receiving member receives the laser beam reflected by the subject matter scanned in order to read the information on the subject matter. An optical member, such as a plane parallel plate, is moved back and forth in the beam of the laser source to change the beam waist of the laser beam.

22 Claims, 21 Drawing Sheets

SCAN TYPE OPTICAL READER WITH CHANGING BEAM WAIST POSITION

BACKGROUND OF THE INVENTION

1. Field of the Invention

This invention relates to an improvement of a scan type optical reader for scanning a subject to be scanned, particularly a bar code pattern, to correctly and easily read information thereof.

2. Related Art Statement

In a scan type optical reader hitherto known, a laser beam of a semiconductor laser emitted through a projecting lens is deflected and projected to a subject to be scanned, and the laser beam reflected by the subject to be scanned is received as a return beam, thereby to read information on the subject to be scanned.

FIG. 1 illustrates a bar code reader 1 as one example of such a conventional scan type optical reader. This bar code reader 1 is a handy type. Within a housing 2 thereof, an optical system is contained. The optical system generally comprises a semiconductor laser 3, a projecting lens 4, a polygon mirror 5, a condenser lens 6, and a photoelectric transferring element 7.

In this bar code reader 1, a bar code information is read in such a manner as that a laser beam P is reflected by the polygon mirror 5 towards a subject 8 to be scanned and deflected to scan the subject 8, and while condensing the laser beam P, as a return beam P', reflected by the subject 8 into the condenser lens 6, the beam P is condensed on the photoelectric transferring element 7.

The laser beam P emitted through the projecting lens 4 is not wave-optically converged into one point. On the contrary, the laser beam P projected by the projecting lens 4 has a beam waist 9 as shown in FIG. 2. The beam diameter $2\phi$ of laser beam P projected by the projecting lens 4 at the beam waist 9 is established by F number which is obtained by dividing the distance l between the projecting lens 4 and the beam waist 9 by the effective aperture diameter D of the projecting lens 4. If the proportional coefficients are $\alpha$ and $\lambda$, the following relation is obtained for the beam diameter $2\phi$ at the beam waist 9 of the laser beam P, the distance l from the projecting lens 4 to the beam waist 9, and the effective aperture diameter D;

$$2\phi = (\alpha \cdot \lambda) l / D \tag{1}$$

In the above-mentioned relation, the proportional coefficient $\alpha$ represents an amount relating to an amplitude distribution of the laser beam on the pupil of the projecting lens 4, and the other proportional coefficient $\lambda$ represents an amount relating to a wave length of the laser beam P.

The beam diameter $2\omega$ of the laser beam P increases corresponding to the distance Z from the beam waist 9 like a quadratic function. Therefore, the beam diameter $2\omega$ at the subject 8 is established by the beam diameter $2\phi$ at the beam waist 9 and the distance Z from the beam waist 9.

The beam diameter $2\omega$, as shown in FIG. 3, is directly related to the accuracy of the reading made by the scan type optical reader. If the beam diameter $2\omega$ is smaller than the minimum bar distance t of the bar code, the bar code can be correctly read. However, if the beam diameter $2\omega$ is larger than the minimum bar distance t and if the laser beam P is projected to a plurality of bars, it becomes difficult to read the bar code easily and correctly.

More specifically, even if the bar code information can be read when the subject 8 to be scanned is within a readable range d which is established by the beam diameter $2\omega'$ corresponding to the minimum bar distance t, since the laser beam P spreads with the beam waist 9 placed therebetween, the laser beam P is projected to a plurality of bars when the subject 8 is present far outside of the readable range d. Therefore, it is difficult to read the bar code correctly.

In view of the above, the conventional optical system is suitably designed taking into consideration the distance to the subject 8 to be read, the minimum bar distance of the bar codes, etc.

For example, if a bar code information on the subject 8 placed at a remote place is to be read, the optical system, as shown in FIG. 4, is designed as such that the beam waist 9 of the laser beam P is formed at a remote place. In this way, if the optical system is designed as such that the beam waist 9 is formed at a remote place, although the beam diameter $2\phi$ at the beam waist 9 becomes large compared with a case where the beam waist 9 is formed at a near place, the readable range d becomes larger and the spreading angle $2\theta$ of the laser beam P becomes smaller, and therefore, the subject 8 placed at a remote place can be correctly read. However, the subject 8 placed at a near place cannot be correctly read. This means that the conventional scan type optical reader can correctly read only a subject which is either placed at a remote place or a near place.

Therefore, in order to correctly read information on the subject 8 to be scanned whether the subject 8 is placed in a near place or a remote place, the optical system is desirably designed as such that the distance from the projecting lens 4 to the beam waist 9 can be changed.

Next, regarding bar code patterns, there are two kinds of patterns; one is the so-called fine specification bar code pattern in which the minimum bar distance (module width) t of the bar code is narrow and the other is the so-called rough specification bar code pattern in which the minimum bar distance t is broad. Hereby, if a consideration is given to a wave-optical image of the laser beam P when the effective aperture diameter D of the projecting lens 4, for example, is formed somewhat large, the diameter $2\phi$ (see FIG. 2) of the beam waist 9 becomes small and therefore, the reader becomes suitable for reading information by scanning the fine specification bar code pattern. However, the spreading angle $2\theta$ of the laser beam P becomes large and the beam diameter $2\omega$ at a distance Z from the beam waist 9 becomes large compared with a case where the effective aperture diameter D is reduced and the beam diameter $2\phi$ at the beam waist 9 is increased. As a result, the readable range d becomes narrow.

Therefore, one thought is given to a case where a rough specification bar code pattern is scanned to read information using such designed bar code reader 1. This means that although the bar code can be read by using the beam waist 9 having a larger beam diameter $2\phi$ than that of the beam waist 9 for reading a fine specification bar code pattern, the beam diameter $2\phi$ of the beam waist 9 for reading a fine specification bar code pattern is used as it is.

In this case, the readable range d is established by the minimum bar distance t of a rough specification bar code pattern and the beam diameter $2\omega'$. Although the readable range d at the time when a rough specification bar code pattern is read, becomes larger than the readable range d at the time when a fine specification bar code pattern is read, the readable range d at the time when the rough specification bar code pattern is read, does not become too large because the spreading angle $2\theta$ of the laser beam P is large in the geometrical optics area. Therefore, such an inconvenience comes to be closed up as that when the rough specification bar code is read by using the bar code reader 1 having an optical system which is designed for meeting with the fine specification bar code pattern, the readable range d is relatively narrow.

On the contrary, if the optical system is designed to meet with the rough specification bar code pattern, since the beam diameter $2\phi$ becomes large at the beam waist 9, the beam diameter $2\phi$ of the beam waist 9 overlaps a plurality of bar codes, the fine specification bar code pattern becomes difficult to read. In this way, the conventional scan type optical reader is inconvenient to correctly read bar codes of different specifications.

Therefore, it is desirable that an optical system of a bar code reader is designed as such that the readable range can be changed so that any bar code having a fine specification bar code pattern or a rough specification bar code pattern can be correctly and easily read.

As apparent from the above-mentioned relation (1), if the effective aperture diameter D of the projecting lens 4 is constant, the beam diameter $2\phi$ at the beam waist 9 of the laser beam P is in proportion to the distance l between the projecting lens 4 and the beam waist 9. On the other hand, the beam diameter of the laser beam P is increased in the area near the beam waist 9 like a quadratic function as it departs from the beam waist 9. The change of the beam diameter $2\omega$ in the area near the beam waist 9 will be described with reference to FIGS. 5 and 6.

FIG. 5 shows the change of the beam diameter in the area near the beam waist $\theta$ when the position of the beam waist 9 is changed when the beam diameter $2\omega$ is 220 μm at the beam waist 9 in a position 50 mm away from an emitting end 1a (see FIG. 1) of the housing, while FIG. 6 shows the change of the beam diameter in the area near the beam waist 9 when the position of the beam waist 9 is changed when the beam diameter $2\phi$ is 190 μm at the beam waist 9 in a position 50 mm away from the emitting end 1a. When the beam diameter $2\phi$ is large at the beam waist 9, the inclination of a linear function showing the relation between the position of the beam waist 9 and the beam diameter $2\phi$ becomes large. This inclination corresponds to the proportional coefficient $\alpha$ of the relation (1). It is apparent that if the proportional coefficient $\alpha$ is small, the information on bar codes placed in a more remote place can be easily and correctly read from the relation between the beam diameter $2\omega'$ and the minimum bar distance t.

By the way, the proportional coefficient $\alpha$ is an amount related to the amplitude distribution of the semiconductor laser 3. As is well known, the semiconductor laser 3 is different in the spreading angle $K_1$ (see FIG. 7) of the emitting laser beam P in the direction $R_1$ parallel with a jointing surface 3a and in the direction $R_2$ vertical to the jointing surface 3a and is different in the amplitude distribution in the direction $R_1$ extending in parallel with the jointing surface 3a and in the direction $R_2$ vertical to the jointing surface 3a as shown in FIG. 8.

Therefore, if the semiconductor laser 3 is arranged as such that the elongated axis ($R_2$ direction) having the large spreading angle K of the laser beam P is parallel with the scanning direction, the proportional coefficient $\alpha$ becomes small and the beam diameter becomes small in the scanning direction. This means that in order to read both the fine specification bar code placed at near place and the rough specification bar code placed at remote place, contrary to the conventional bar code reader in which the readable range is made large to some extent at the sacrifice of the beam diameter $2\phi$ at the beam waist 9, according to the bar code reader in which the beam waist 9 is formed in the near place when the bar code is placed near and the beam waist 9 is formed in the remote place when the bar code is placed in the remote place, it is preferable that the beam diameter $2\phi$ is made as small as possible within a range unaffected by unevenness of dust and label on the bar code label at the beam waist 9 without giving a careful thought to the readable range d.

Furthermore, the semiconductor laser 3 is preferably arranged as such that the elongated axis direction where the large spreading angle K is large, is the scanning direction because of the following reason.

That is, if the semiconductor 3 is arranged as such that the elongated direction corresponding to the large spreading angle $K_1$ is held in parallel with the scanning direction, the change of the laser beam P entering into the projecting lens 4 is relatively small in spite of a presence of irregularity of the spreading angle K due to differences of individual semiconductor lasers 3 as shown in FIG. 9 and therefore, the fluctuation of the beam diameter $2\omega$ is small in the scanning direction. However, if the semiconductor laser 3 is arranged as such that the short axis direction where the spreading angle $K_1$ is small, is in parallel with the scanning direction, the change of the laser beam P entering into the projecting lens 4 becomes relatively large due to irregularity of the spreading angle $K_1$ of the individual semiconductor laser 3 as shown in FIG. 10 and therefore, the beam diameter is undesirably largely fluctuated in the scanning direction.

SUMMARY OF THE INVENTION

It is therefore a first object of the present invention to provide a scan type optical reader which is convenient to correctly read information by scanning a subject to be scanned.

A second object of the present invention is to provide a scan type optical reader comprising a deflecting system for deflecting a laser beam emitted through a projecting lens and projecting the laser beam to a subject to be scanned; a light receiving system for receiving the laser beam, as a return beam, reflected by the subject to be scanned in order to read information on the subject; an optical member for changing a beam waist position disposed to at least one side of an inlet and an outlet sides of the laser beam with the projecting lens placed therebetween and adapted to change a beam waist position of the laser beam with respect to the projecting lens; and a switch means for switching the optical member for changing a beam waist position between an sintering position into an optical path of the laser beam and a retreating position from the optical path of the laser beam, thereby to be able to easily and correctly read information by scanning a subject to be scanned whether the subject is placed in a near place or in a remote place.

A third object of the present invention is to provide a scan type optical reader comprising a semiconductor laser having a plurality of illuminating points; a projecting lens for projecting a laser beam emitted by each illuminating point of the semiconductor laser; a deflecting system for deflecting the laser beam emitted through the projecting lens and projecting the laser beam to a subject to be scanned; and a light receiving system for receiving the laser beam, as a return beam, reflected by the subject to be scanned in order to read information on the subject to be scanned; an object plane including each illuminating point of the semiconductor laser and the projecting lens being disposed at angles so as to obtain an inclined image plane spatially with respect to the object plane, thereby to be able t easily and correctly read information by scanning a subject to be scanned whether the subject is placed in a near place or in a remote place.

A fourth object of the present invention is to provide a scan type optical reader comprising a deflecting system for deflecting a laser beam emitted through a projecting lens and projecting the laser beam to a subject to be scanned, a light receiving system for receiving a laser beam, as a return beam, reflected by the subject to be scanned in order to read information on the subject to be scanned; and a diaphragm member disposed at least at one side of an outlet and an inlet sides of the laser beam with the projecting lens placed therebetween and changing an effective aperture diameter of the projecting lens, thereby to be able to change the readable range of the laser beam according to the code specification.

A fifth object of the present invention is to provide a bar code reader which is suitable to read a bar code information.

BRIEF DESCRIPTION OF THE DRAWINGS

The nature of the present invention, as well as other objects and advantages thereof, will be readily apparent to those skilled in the art from a consideration of the following detailed description relating to the accompanying drawings, wherein:

FIGS. 11 through 16 are illustrations for explaining a first embodiment of the present invention wherein;

FIG. 11 is a sectional view showing the arrangement of an optical member thereof;

FIG. 12 is a plan view of a rotary holding member of FIG. 11;

FIG. 13 is a schematic view for explaining the function of a plane parallel plate of FIG. 11;

FIG. 15 is an illustration showing a first modified embodiment of the rotary holding member of the first embodiment;

FIG. 16 is an illustration showing a second modified embodiment of the rotary holding member of the first embodiment;

FIGS. 17 and 18 are illustrations for explaining the scan type bar code reader according to a second embodiment of the present invention, wherein;

FIG. 17 is a partly sectional view showing a plane parallel plate and a switch means of the scan type bar code reader;

FIG. 18 is a schematic view for explaining the function of the plane parallel plate of FIG. 17;

FIGS. 19 and 20 are illustrations for explaining a scan type bar code reader according to a third embodiment of the present invention, wherein;

FIG. 19 is an illustration showing an arrangement of an optical member when a cylindrical lens is used as the optical member for changing the beam waist position;

FIG. 20 is a partly plan view showing a beam shape formed on a bar code by the cylindrical lens;

FIGS. 24 and 25 are illustrations for explaining a scan type bar code reader according to a sixth embodiment of the present invention, wherein;

FIG. 24 is a schematic view for explaining the successive change of the thickness of a part of a wedge shaped optical member which is entered into an optical path of the laser beam;

FIG. 25 is an illustration for explaining the advantage when the wedge shaped optical member is used;

FIGS. 26 through 29 are illustrations for explaining a scan type bar code reader according to a seventh embodiment of the present invention, wherein;

FIG. 26 is an illustration showing an optical arrangement of the scan type bar code reader;

FIG. 27 is a plan view showing one example of a semiconductor laser used in the scan type bar code reader;

FIG. 28 is a schematic view showing a feature of an optical system of the scan type bar code reader;

FIG. 29 is a partly enlarged view of a projection lens and a semiconductor laser of FIG. 28;

FIGS. 30 through 37 are illustrations for explaining a scan type bar code reader according to eighth embodiment of the present invention, wherein;

FIG. 30 is an illustration showing an optical arrangement of the scan type bar code reader and a sectional view taken along line I—I of FIG. 35;

FIG. 31 is a schematic view showing an important part of the optical system thereof;

FIG. 32 is a partly enlarged view of the important part of the optical system;

FIG. 33 is an illustration showing a beam shape formed on a subject to be scanned;

FIG. 34 is an illustration showing the output of a reading signal of the scan type bar code reader;

FIG. 35 is a plan view of a diaphragm member of FIG. 30;

FIG. 36 is an illustration showing a first modified embodiment of the diaphragm;

FIG. 37 is an illustration showing a second modified embodiment of the diaphragm;

FIGS. 38 through 41 are illustrations for explaining a scan type bar code reader according to a ninth embodiment of the present invention, wherein;

FIG. 38 is an illustration showing an optical arrangement of the scan type bar code reader and is a sectional view taken along line I—I of FIG. 39;

FIG. 39 is a plan view of a diaphragm of FIG. 38; and

FIGS. 40 and 41 are illustrations showing a first and a second modified embodiments thereof.

DETAILED DESCRIPTION OF THE PREFERRED EMBODIMENTS

One embodiment of the present invention will be described hereunder with reference to the accompanying drawings, in which a scan type optical reader according to the present invention is applied to a handy type scan type bar code reader.

Figure 1:
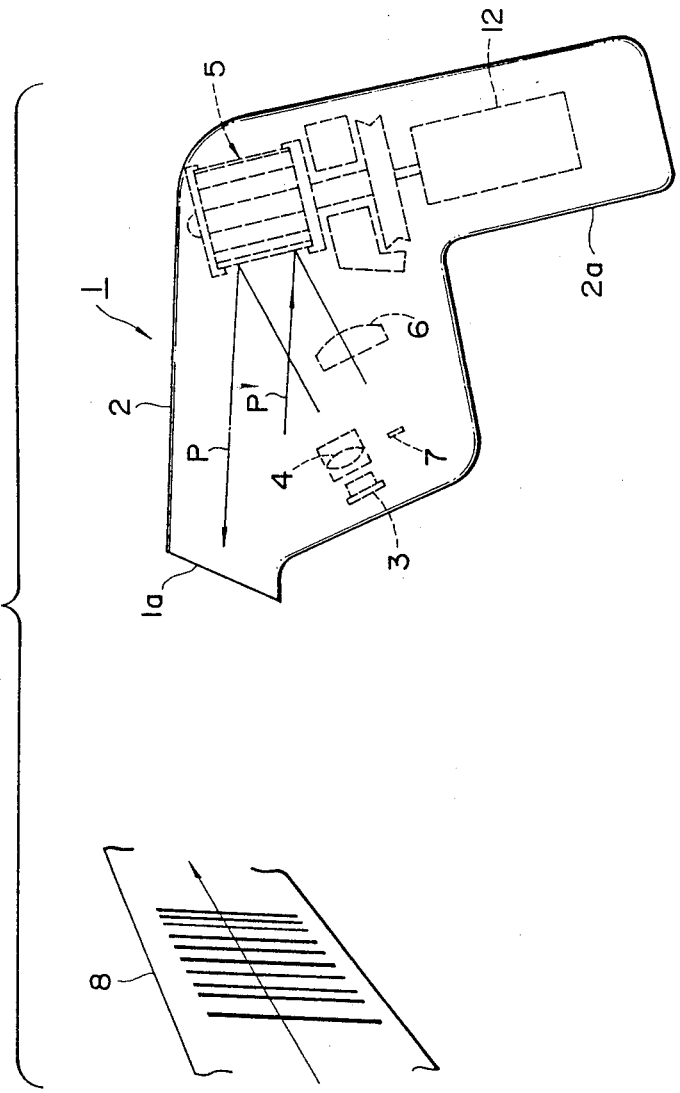
FIG. 1 is a schematic view of a conventional handy type scan type bar code reader.
Figure 2:
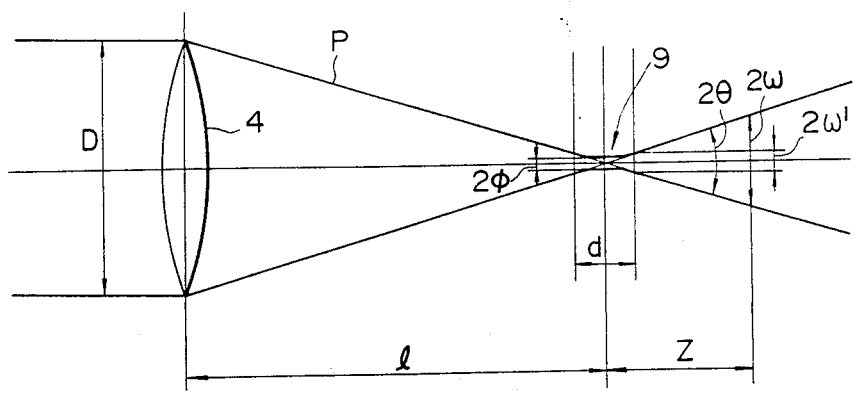
FIG. 2 is a schematic view for explaining a beam waist which is formed by a projecting lens of the scan type bar code reader of FIG. 1.
Figure 3:
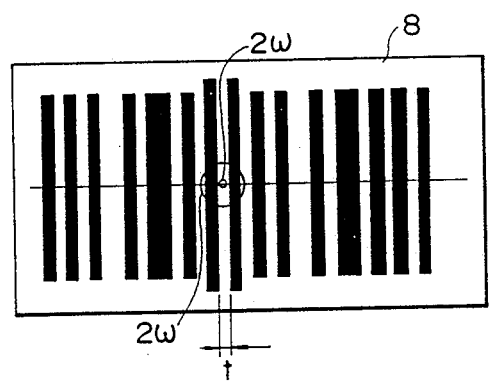
FIG. 3 is an illustration for explaining the illuminating state of a subject to be scanned of FIG. 1.
Figure 4:
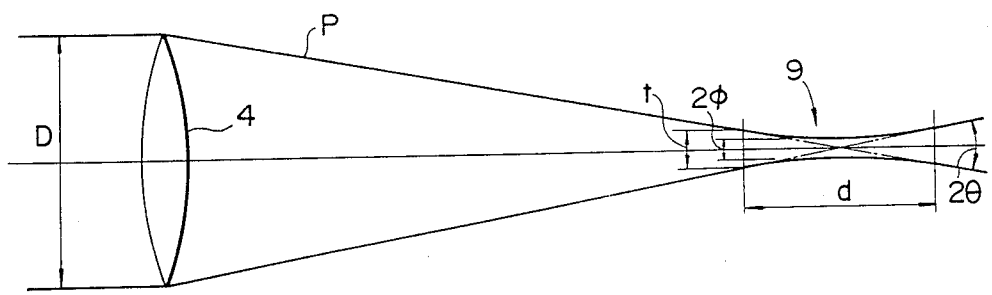
FIG. 4 is an illustration for explaining a beam waist formed in a remote place by a projecting lens of the scan type bar code reader of FIG. 1.
Figure 5:
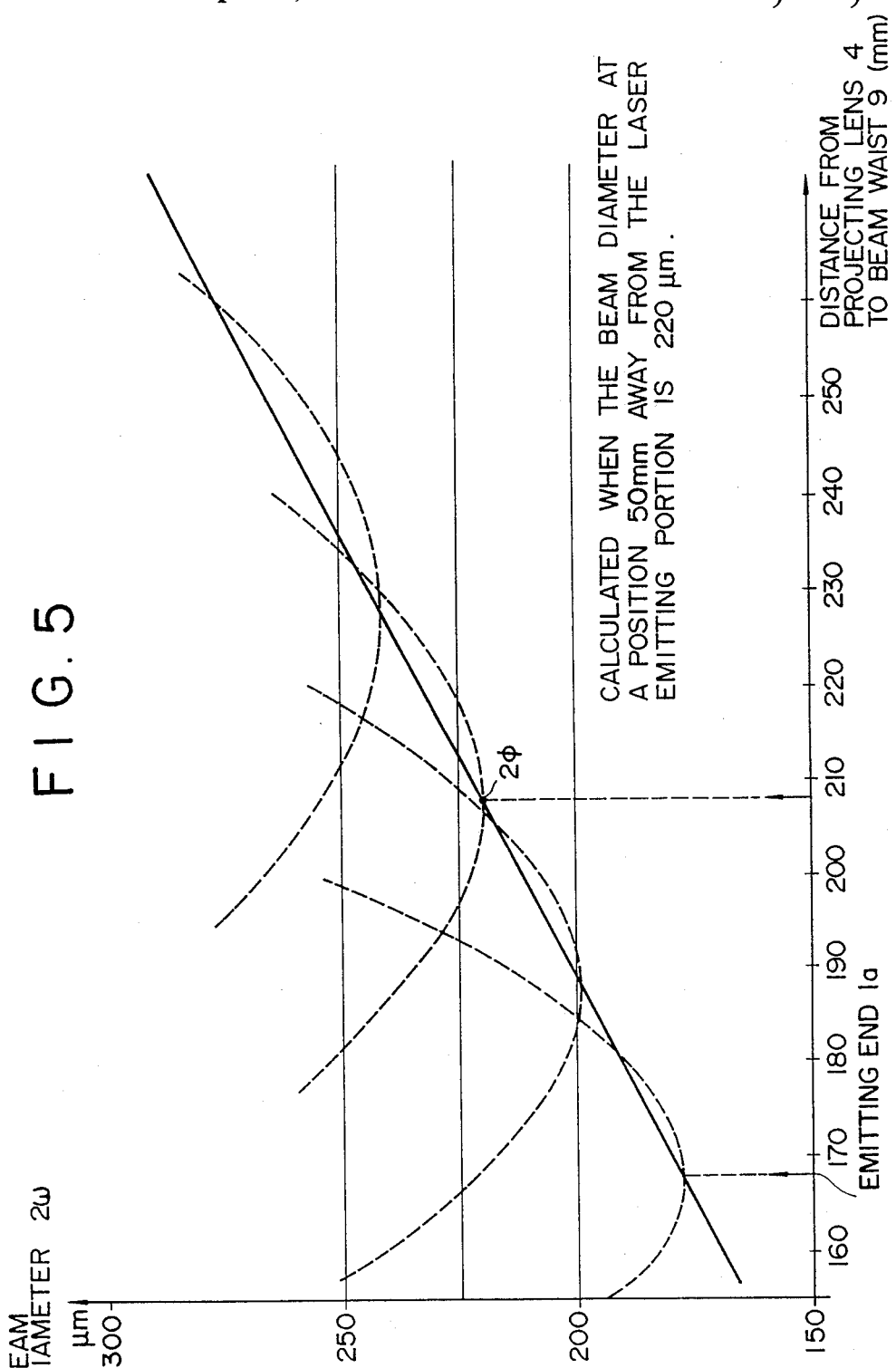
FIGS. 5 and 6 are graphs showing the change of the beam diameter at the beam waist when the distance from the projecting lens to the beam waist of FIG. 2 is changed.
Figure 11:
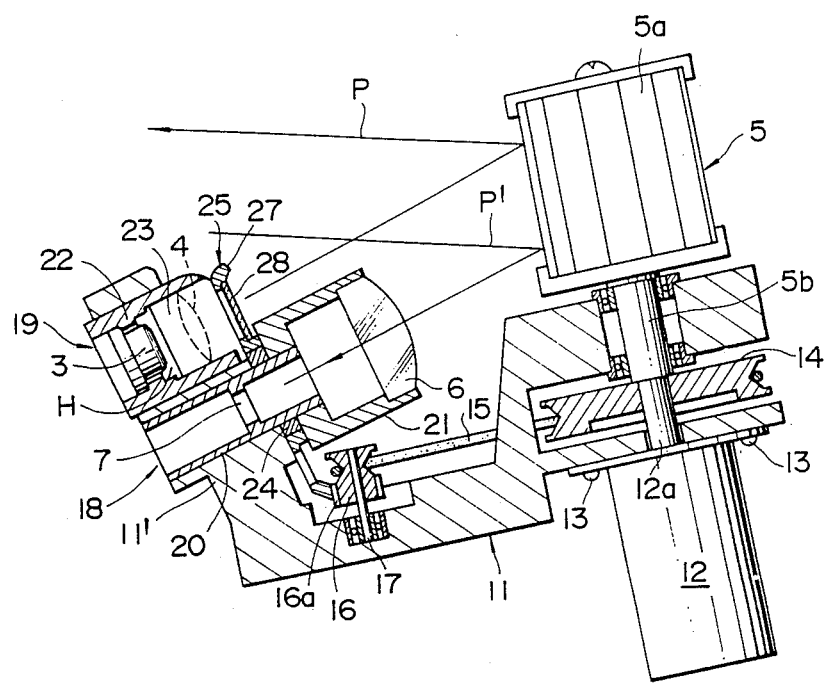

FIGS. 11 through 16 are illustrations showing a first embodiment of a handy type scan type bar code reader, in which FIG. 11 is an illustration showing an arrangement thereof. In FIG. 11, reference numeral 11 denotes a base. The base 11 is provided with a coreless motor 12 at a rear part corresponding to a grip portion 2a of a housing 2 as shown in FIG. 1. The coreless motor 12 is secured to the base 11 by screws 13 and is driven when a trigger (not shown) is triggered.

The coreless motor 12 is provided at an output shaft 12a thereof with a pulley 14. The output shaft 12a is connected with a rotary shaft 5b of a polygon mirror 5. The polygon mirror 5 is directly driven by the coreless motor 12. The pulley 14 is connected to a pulley gear body 16 through a belt 15. The pulley gear body 16 is rotatably supported by the base 11 through a rotary shaft 17.

Figure 12:
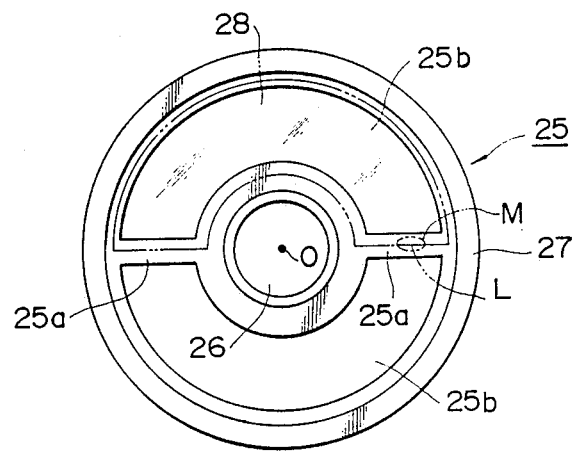

The base 11 is provided at an upper portion thereof with a mounting portion 11'. The mounting portion 11' is provided with a light receiving portion 18 and a light projecting portion 19. The light receiving portion 18 includes a holding barrel 20 for holding the photoelectric transfer element 7 and another holding barrel 21 for holding the condenser lens 6. The light projecting portion 19 includes a holding barrel 22 for holding the semiconductor laser 3 and a lens barrel 23 of the projecting lens 4. The holding barrel 20 is provided with a coreless bearing 24. The coreless bearing 24 is provided with a rotary holding member 25 fitted thereto. The rotary holding member 25 is formed in a ring shape as shown in FIG. 12. The rotary holding member 25 is formed at a central portion thereof with a engaging hole 26 for engaging with the coreless bearing 24. The rotary holding member 25 is formed at an outer peripheral portion thereof with a gear portion 27 for meshing with a gear portion 16a of the pulley gear body 16. The rotary holding member 25 is rotated in synchronism with the polygon mirror 5 according to the rotation of the pulley gear body 16.

Figure 13:
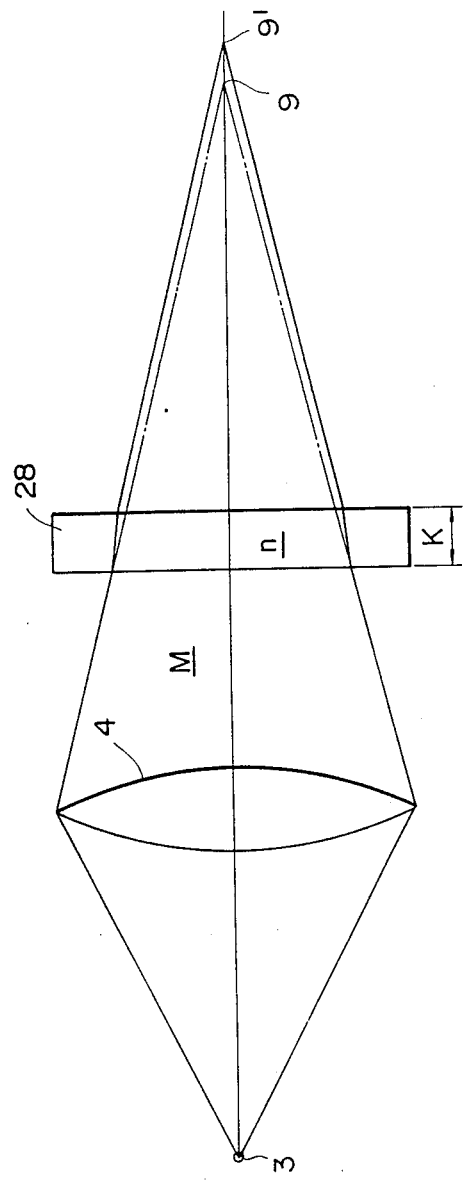

The rotary holding member 25 includes a connecting portion 25a for connecting the outer peripheral portion to the central portion, and a pair of semi-annular opening 25b. One semi-annular opening 25b is provided with a semi-annular plane parallel plate 28 attached thereto. The plane parallel plate 28 is made of, for example, glass or synthetic resin. The plane parallel plate 28, in this embodiment, is disposed at an outlet side with the projecting lens 4 placed therebetween. The plane parallel plate 28 is periodically entered into an optical path M of the laser beam P according to the rotation of the rotary holding member 25. When the plane parallel plate 28 enters into the optical path M of the laser beam P, the beam waist 9 is moved to a more remote place from the projecting lens 4 than the place where the beam waist 9 is present when the plane parallel plate 28 is retreated from the optical path M since an apparent optical distance at the outlet side is changed by $k(n-1)/n$ due to the refractive index n and the thickness k of the plane parallel plate 28 as schematically shown in FIG. 13.

That is, the plane parallel plate 28 functions as an optical member for changing the position of the beam waist 9 with respect to the projecting lens 4. On the other hand, the rotary holding member 25 functions as a switch means for switching the optical member for changing the beam waist position between an entering position into the optical path M of the laser beam P and a retreating position from the optical path M of the laser beam P. Provided that the number of reflecting planes 5a of the polygon mirror 5 is N pieces and the rotary holding member 25 is rotated by one rotation according to one rotation of the polygon mirror 5, the subject 8 to be scanned is scanned N/2 times every time the plane parallel plate 28 crosses the optical path M of the laser beam P once.

More specifically, the plane parallel plate 28 is present in the retreating position from the optical path M during a half rotation of the polygon mirror 5. At that time, when the bar code reader 1 is faced toward the subject 8 placed in the near place, the scanning is performed N/2 times and a reading signal S is obtained as shown in FIG. 14A. On the other hand, when the bar code reader 1 is faced towards the subject 8 placed in the remote place, only a noise NS is obtained. The plane parallel plate 28 is present in the entering position into the optical path M during the successive half rotation of the polygon mirror 5. At that time, when the bar code reader 1 is faced toward the subject 8 placed in the remote place, the scanning is performed N/2 times and a reading signal S is obtained. On the other hand, when the bar code reader 1 is faced toward the subject placed in the near place, only a noise NS is obtained.

Figure 14B:
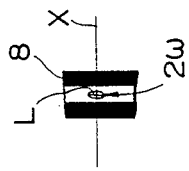
FIG. 14B is a partly plan view showing a beam shape on a bar code.
Figure 14A:
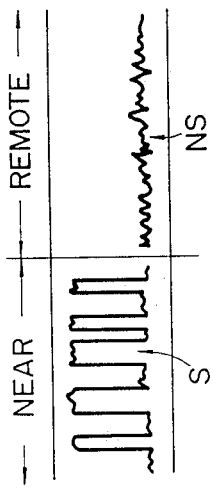
FIG. 14A is a schematic view for explaining the output of a reading signal of a bar code reader.

In order to make the beam diameter $2\phi$ as small as possible at the beam waist 9 and restrain the fluctuation of the beam diameter in the scanning direction due to irregularity of the spreading angle $K_1$, the semiconductor 3, as shown in FIG. 14B, is arranged as such that the elongated axis direction having the large spreading angle $K_1$, of the laser beam P is in the scanning direction X. Therefore, the beam diameter 2 of the laser beam P is largely diaphragmed in the scanning direction by the projecting lens 4 and the laser beam P emitted through the projecting lens 4 exhibits an elliptical shape as the beam waist. If the beam waist position is to be changed depending on whether the plane parallel plate is existed or not as described, it may happen that a very thin plane parallel plate is required to be used. In such case, it is preferable that the beam waist is controlled by keeping the plane parallel) plate normally inserted therein and changing the thickness and refractive index thereof.

Figure 15:
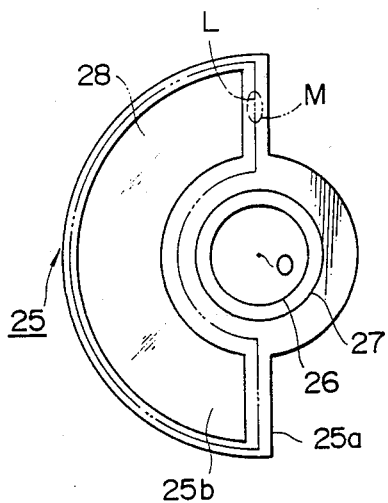

FIG. 15 is an illustration showing a first modified embodiment of the rotary holding member according to the first embodiment. In this first modified embodiment, a rotary holding member 25 itself is formed in a half ring shape and a plane parallel plate 28 is attached to an opening 25b thereof. In this case, a gear 27 is formed on the outer periphery of the central portion.

Figure 16:
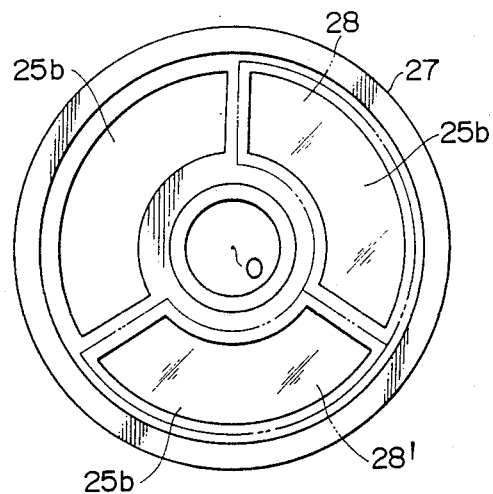

FIG. 16 is an illustration showing a second modified embodiment of the rotary holding member 25 according to the first embodiment. In this second modified embodiment, the rotary holding member 25 is formed with three sectoral openings 25b. Two sectoral openings 25b are provided with plane parallel plates 28 and 28′ having a different refractive index n and attached thereto, respectively. According to the second modified embodiment, the position of the beam waist 9 can be changed in three stages with respect to the projecting lens 4. The plane parallel plates 28 and 28′ may have a different thickness k instead of the different refractive index n. On the contrary, the plane parallel plates 28 and 28′ may be different both in refractive index n and thickness k. Moreover, the number of the plane parallel plates 28 mounted to the rotary holding member 25 may be three pieces or more.

In the above-mentioned first embodiment, the rotary holding member 25 is rotated in synchronism with the rotation of the polygon mirror 5 to cause the plane parallel plate 28 to cross the optical path M. Alternatively, the rotary holding member 25 may be manually rotated by operator to cause the plane parallel plate 28 to enter into or retreat from the optical path M.

Furthermore, in the above-mentioned first embodiment, the plane parallel plate 28 is disposed at the outlet side of the laser beam P with the projecting lens placed therebetween. Alternatively, the rotary holding member 25 may be disposed in such a manner as to enter into a space H (see FIG. 11) between the semiconductor laser 3 and the projecting lens 4 and the plane parallel plate 28 may be disposed at the inlet side of the laser beam P with the projecting lens placed therebetween.

Figure 17:
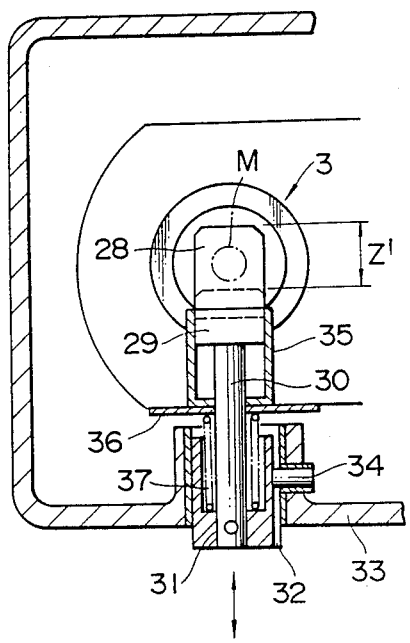
Figure 18:
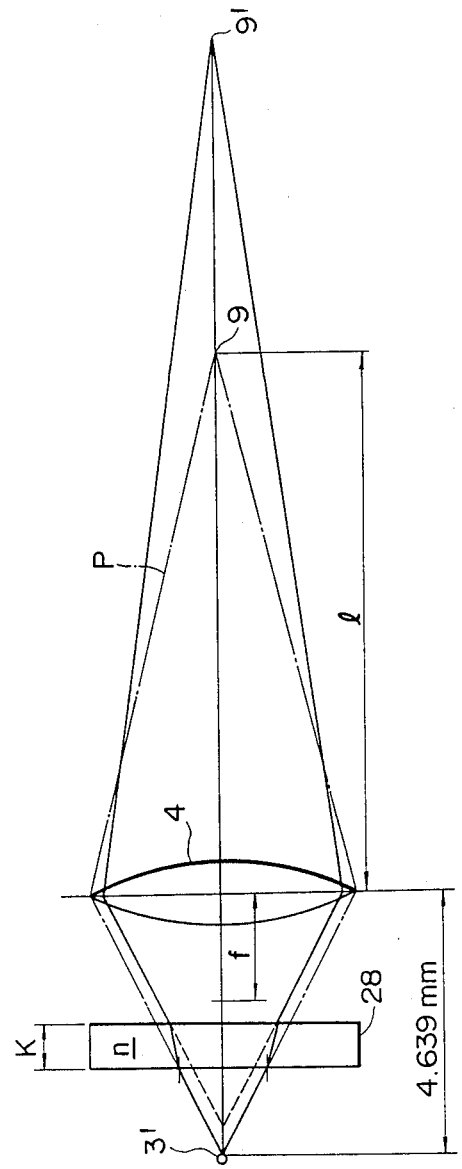

FIGS. 17 and 18 are illustrations showing a second embodiment of a scan type bar code reader according to the present invention, in which the plane parallel plate 28 is disposed to the space H (see FIG. 11) between the semiconductor laser 3 and the projecting lens 4 and the optical distance at the inlet side of the laser beam with the projecting lens 4 placed therebetween, is changed to change the position of the beam waist 9.

In FIG. 17, 29 denotes a holding member for holding the plane parallel plate 28. A lower portion of the holding member 29 is mounted to a rod 30. The rod 30 is mounted to a cylindrical sliding body 31. The mounting portion 11′ of the base 11 is formed with a frame portion 33. The sliding body 31 is formed with a guiding groove 32. The guide groove 32 is provided with a guide pin 34 threadedly attached to the frame portion 33 and fitted into the guide groove 32. The plane parallel plate 28 comes in and comes out of the a containing cylinder 35 by sliding the sliding body 31 in the arrow direction. Between the bottom portion 36 of the containing cylinder 35 and the sliding body 31, a spring 37 for energizing the sliding body 31 in the containing direction of the plane parallel plate 28, is disposed.

In the bar code reader according to the second embodiment, if the rod 30 is moved in the direction against the energizing force of the spring 37 by means of a manual operating means (not shown), the plane parallel plate 28 enters into the optical path M and the optical distance at the inlet side is changed. As a result, the position of the beam waist 9 is changed as shown in FIG. 18. In this embodiment, the holding member 29, the rod 30, the sliding body 31, and the spring 37 forms a switch means for switching the plane parallel plate 28 between an entering position into the optical path M of the laser beam P and a retreating position from the optical path M of the laser beam P. Reference character Z′ denotes a stroke of the plane parallel plate 28.

According to this second embodiment, since the plane parallel plate 28 is disposed at the inlet side of the laser beam P, the position of the beam waist 9 can be largely changed compared with the one of the first embodiment.

For example, if the focal distance f of the projecting lens 4 is set as 4.5 mm and the illuminating point 3′ of the semiconductor laser 3 is disposed to a position 4.639 mm away from the projecting lens 4, the distance l from the projecting lens 4 to the beam waist 9 is l=150 mm when the plane parallel plate 28 is retreated from the optical path M. If the refractive index n is changed when the thickness k of the plane parallel plate 28 is as k=0.2 mm, the distance l from the projecting lens 4 to the position of the beam waist 9 is changed as shown n Table 1.

TABLE 1

| n = 1.5 | l = 284 mm |
|---------|------------|
| n = 1.6 | l = 321 mm |
| n = 1.7 | l = 362 mm |
| n = 1.8 | l = 409 mm |

If the thickness k is changed when the focal distance f of the projecting lens 4 is 4.5 mm, the illuminating point 3′ of the semiconductor laser 3 is in a position 4.639 mm away from the projecting lens 4, and the refractive index n of the plane parallel plate 28 is n=1.5, the distance l from the projecting lens 4 to the position of the beam waist 9 is changed as shown in Table 2.

TABLE 2

| k = 0.05 mm | l = 170 mm |
|-------------|------------|
| k = 0.10 mm | l = 196 mm |
| k = 0.15 mm | l = 232 mm |
| k = 0.20 mm | l = 284 mm |
| k = 0.25 mm | l = 368 mm |

Therefore, the position of the beam waist 9 can be suitably changed by suitably selecting the refractive index n and the thickness k of the plane parallel plate 28.

In this second embodiment, the number of the plane parallel plate 28 is one. Alternatively, a plurality of parallel plates having a different thickness k or a different refractive index n may be suitably combined. Otherwise, a plurality of parallel plates having both different thickness k and refractive index n may be suitably combined.

Figure 19:
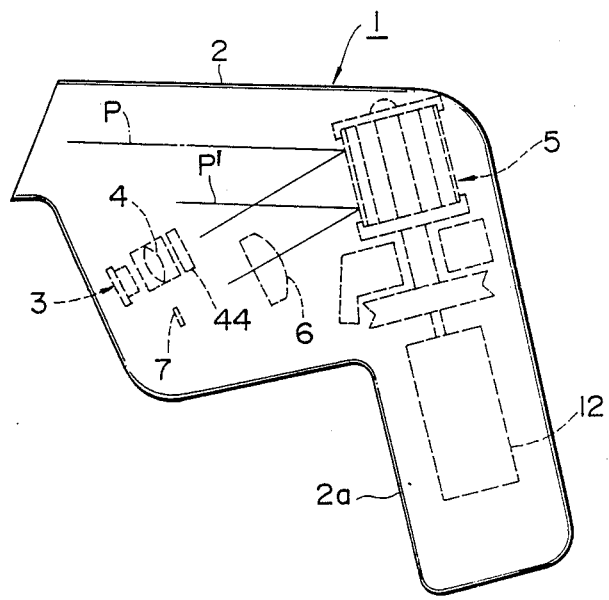
Figure 20:
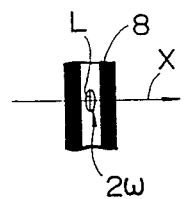

FIGS. 19 and 20 illustrate a third embodiment of a scan type bar code reader according to the present invention, in which a cylindrical lens 44 as an optical member for changing a beam waist position is disposed at the outlet side of the laser beam with the projecting lens 4 placed therebetween is retreatably disposed to the optical path M of the laser beam M. According to this third embodiment, when the cylindrical lens 44 is entered into the optical path M of the laser beam P, the position of the beam waist 9 is moved to a near place to the projecting lens 4. If the cylindrical lens 44 is arranged as such that the direction where the cylindrical lens 44 has a power is the same as the scanning direction X to which the laser beam P is deflected, the beam diameter 2 of the laser beam as shown in FIG. 20, becomes an elliptic shape having an elongated axis 1 in the extending direction of a bar of the bar code, and therefore, the bar code information on a subject to be scanned which is placed in a near place, can be correctly and easily read.

In this third embodiment, the cylindrical lens 44 is used as the optical member for changing the beam waist position. Alternatively, a concave lens may be used as the optical member for changing the beam waist position. A suitable selection of the focal distance f of this concave lens makes it possible to move the position of the beam waist 9 to a more remote place from the projecting lens 4. For example, if the focal distance f of the projecting lens 4 is set as f=4.5 mm and the illuminating point 3' of the semiconductor laser 3 is set to a position 4.639 mm away from the projecting lens 4, the distance l from the projecting lens 4 to the position of the beam waist 9 is l=150 mm when the concave lens is in the retreating position. However, if a concave lens of f=−375 mm is used, the distance l from the projecting lens 4 to the position of the beam waist 9 becomes l=250 mm. Alternatively, a convex lens may be used. If this convex lens is entered into the optical path M, the beam waist 9 which is supposed to be formed in a remote place, is formed in a near place.

Figure 21:
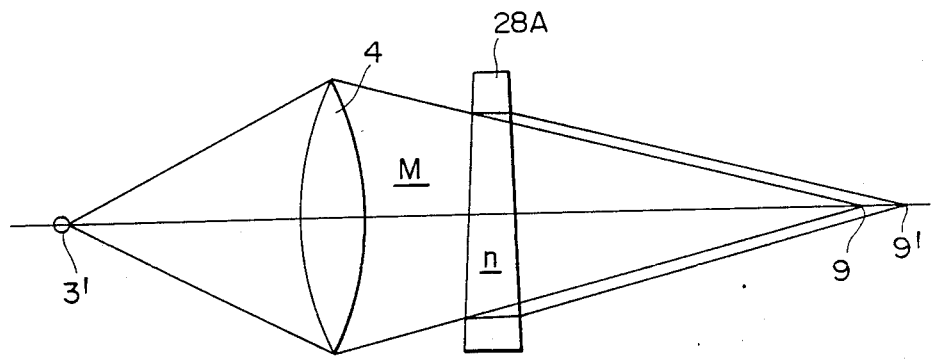
FIGS. 21 and 22 are illustrations for explaining a scan type bar code reader according to a fourth embodiment of the present invention and are schematic views for explaining the function of a wedge shaped optical member as an optical member for changing the beam waist position.
Figure 22:
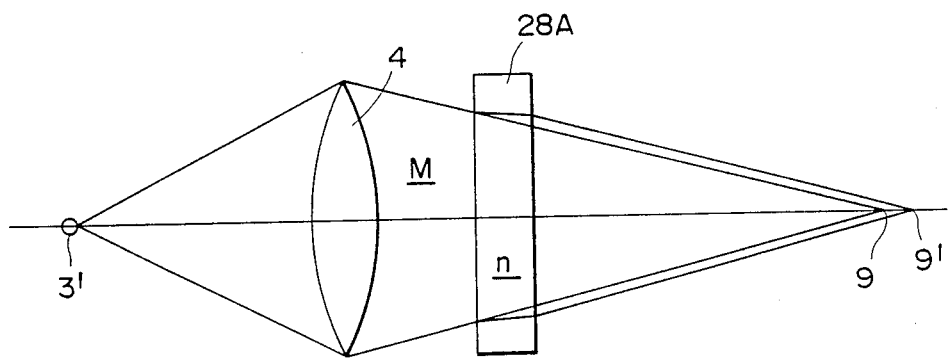

FIGS. 21 and 22 schematically illustrate a fourth embodiment of a scan type bar code reader according to the present invention, in which a wedge shaped optical member 28A (as shown in FIGS. 21 and 22) is attached to the rotary holding member 25 instead of the construction in which the plane parallel plate 28 (as shown in FIG. 12) is attached to the rotor holding member 25.

The wedge shaped optical member 28A like the plane parallel plate 28 is made of glass or synthetic resin. The wedge shaped optical member 28A like the plane parallel plate 28 is periodically entered into the optical path M of the laser beam P by the rotation of the rotary holding member 25. When the wedge shaped optical member 28A is entered into the optical path M of the laser beam P, the apparent optical distance at the outlet side is changed due to the refractive index n and the shape of the wedge shaped optical member 28A. Therefore, the beam waist 9' is moved to a more remote place than the position where the beam waist is present when the wedge shaped optical member 28A is retreated from the optical path M serving the position of the projecting lens 4 as a reference. By this, the beam spot has a spread in a perpendicular direction with respect to the scanning direction.

The wedge shaped optical member 28A like the plane parallel plate 28 functions as the optical member for changing the position of the beam waist 9 with respect to the projecting lens 4, while the rotary holding member 25 like the first embodiment functions as the switch means for switching the wedge shaped optical member 28A between the entering position into the optical path M of the laser beam P and the retreating position from the optical path M of the laser beam P. Supposing that the number cf the reflecting planes of the polygon mirror 5 is N and the rotary holding member 25 is rotated by one rotation per one turn thereof, the subject 8 to be scanned is scanned N/2 times every time the wedge shaped optical member 28A crosses the optical path M once in the same manner as the first embodiment.

Although the fourth embodiment has been described, the construction of the fourth embodiment may be altered as such that the wedge shaped optical member 28A is attached to the rotary holding member 25 (see FIG. 15) of the first modified embodiment of the first embodiment or the wedge shaped optical member 28A is attached to the rotary holding member 25 (see FIG. 16) of the second modified embodiment of the first embodiment. Furthermore, a plurality of wedge shaped optical members 28A having a different shape or different refractive index n may be selectively combined, or a plurality of wedge shaped optical members 28A having both different shape and refractive index n may be selectively combined, or the rotary holding member 25 may be manually operated by operator in the same manner as the first embodiment.

Figure 23:
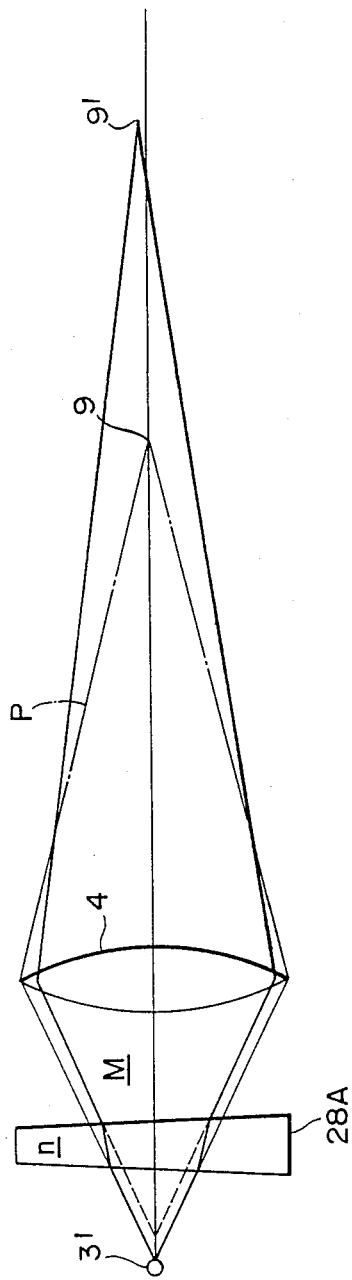
FIG. 23 is an illustration for explaining a scan type bar code reader according to a fifth embodiment of the present invention and is a schematic view for explaining the function of a wedge shaped optical member corresponding to the second embodiment.

FIG. 23 illustrates a fifth embodiment of a scan type bar code reader according to the present invention, in which the wedge shaped optical member 28A is attached to the holding member 29 instead of the construction in which the plane parallel plate 28 is attached to the holding member 29 as shown in FIG. 17.

According to this fifth embodiment, since the wedge shaped optical member 28A is disposed at the inlet side of the laser beam P, the position of the beam waist 9 can be largely changed compared with the one of the fourth embodiment.

Figure 24:
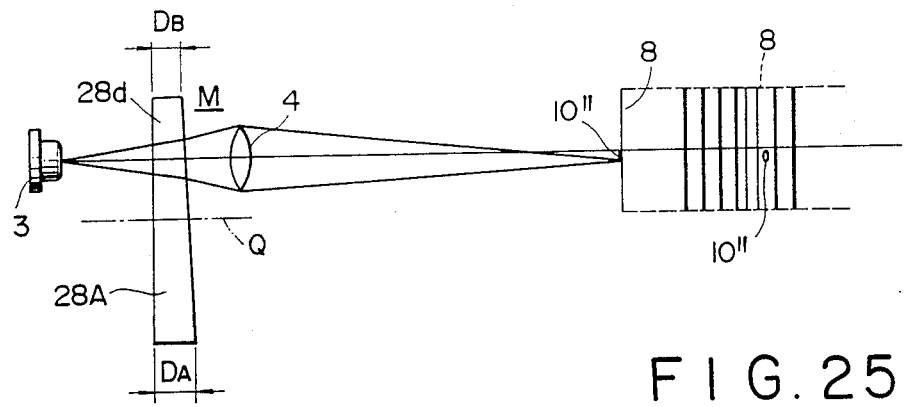
Figure 25:
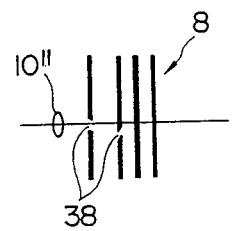

FIGS. 24 and 25 illustrate a sixth embodiment of a scan type bar code reader according to the present invention, in which the wedge shaped optical member 28A is formed of a cylindrical plate shaped optical member having a wedge shape in section, and the wedge shaped optical member 28A is rotated about the center Q of the cylindrical plate shaped optical member to successively change the thickness of a portion 28d of the wedge shaped optical member 28A which enters into the optical path M.

According to the six embodiment, since the thickness of the portion 28d of the wedge shaped optical member 28A which enters into the optical path M is changed between $D_A$ and $D_B$, the position of the beam waist 9 can be seccesively changed from a near place to a remote place, or from the remote place to the near place.

In general, if the wedge shaped optical member 28a is used, a comma aberration is produced and a beam spot 10" at the subject 8 to be scanned is vertically elongated in the successively changing direction of the thickness of the wedge shaped optical member 28A. If the scanning is performed in such a manner as that the beam spot 10" is elongated in the longitudinal direction of the bar of the bar code, the scanning can be performed including a place excluding a printing defect 38. Therefore, even when the scanning is performed directly over the printing defect 38 of the bar code on the subject 8 to be scanned, a reading error due to the printing defect 38 can be avoided.

Figure 6:
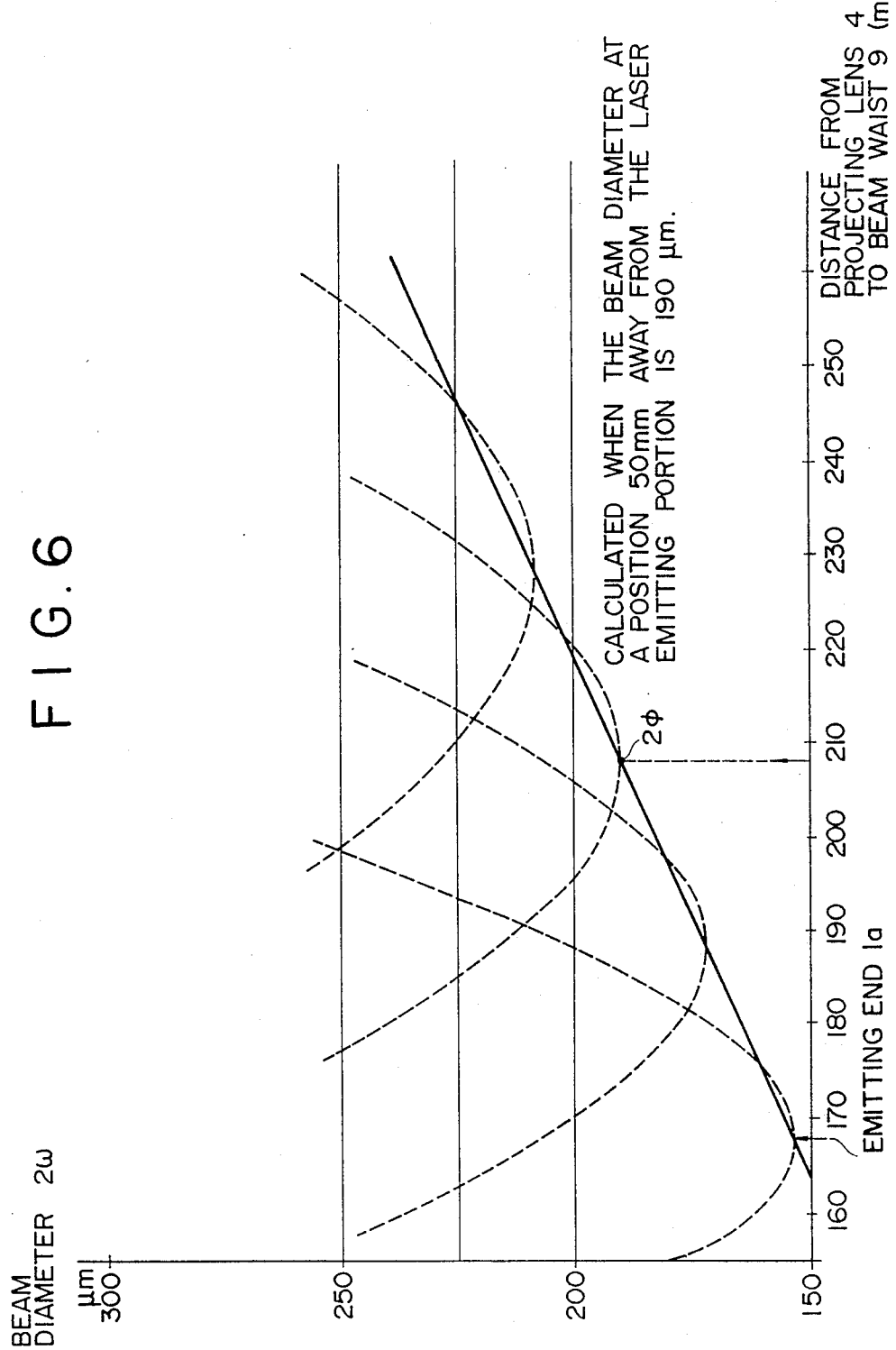
Figure 7:
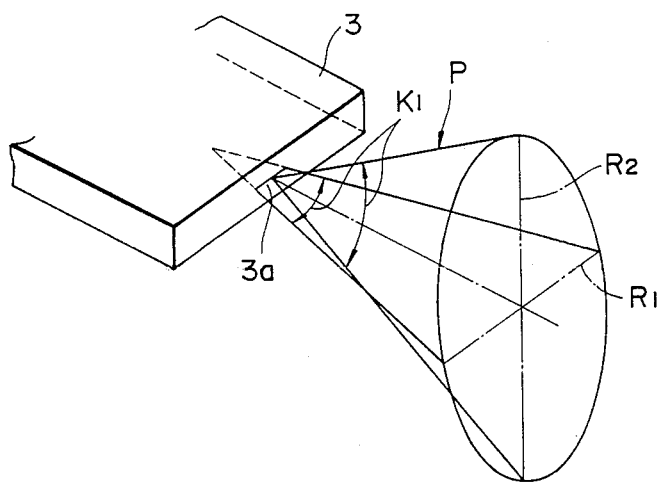
FIG. 7 is an illustration for explaining a spreading angle of the laser beam emitted by a semiconductor laser of a scan type bar code reader.
Figure 8:
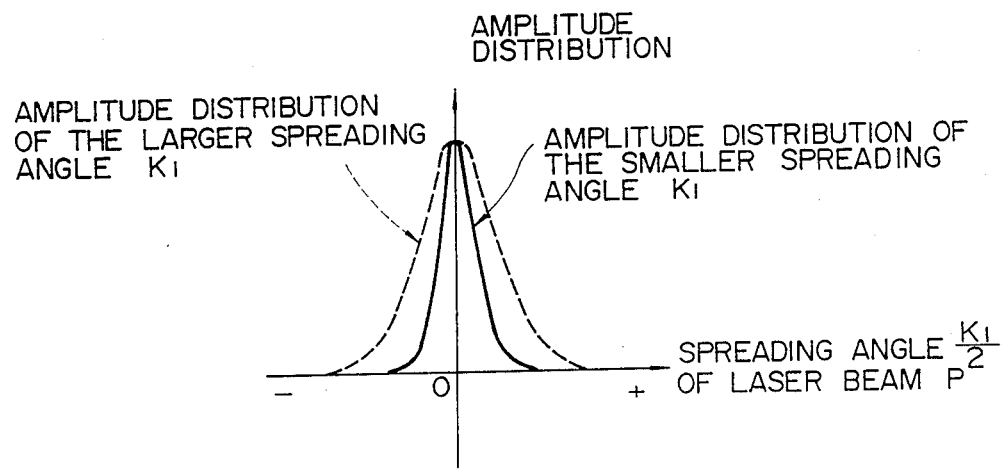
FIG. 8 is a graph for explaining a relation between the spreading angle and an amplitude distribution thereof.
Figure 9:
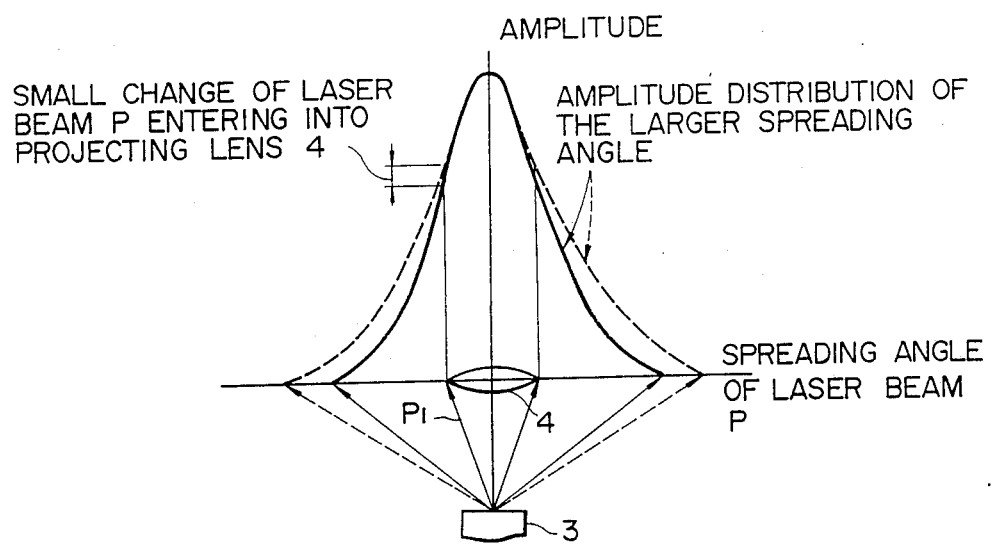
FIGS. 9 and 10 are illustrations for explaining that the semiconductor laser is preferably arranged as such that an elongated axis direction having a large spreading angle of the laser beam is in the scanning direction in order to restrict the fluctuation of the beam diameter in the scanning direction.
Figure 10:
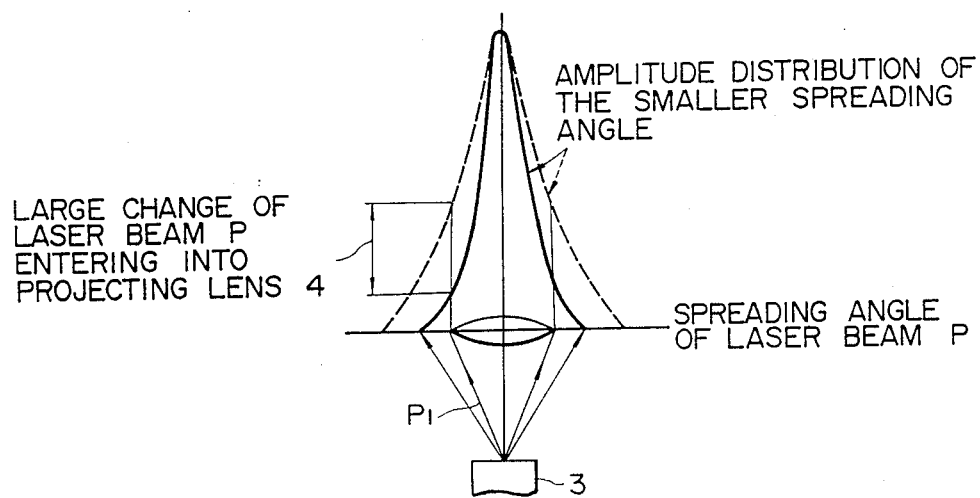
Figure 26:
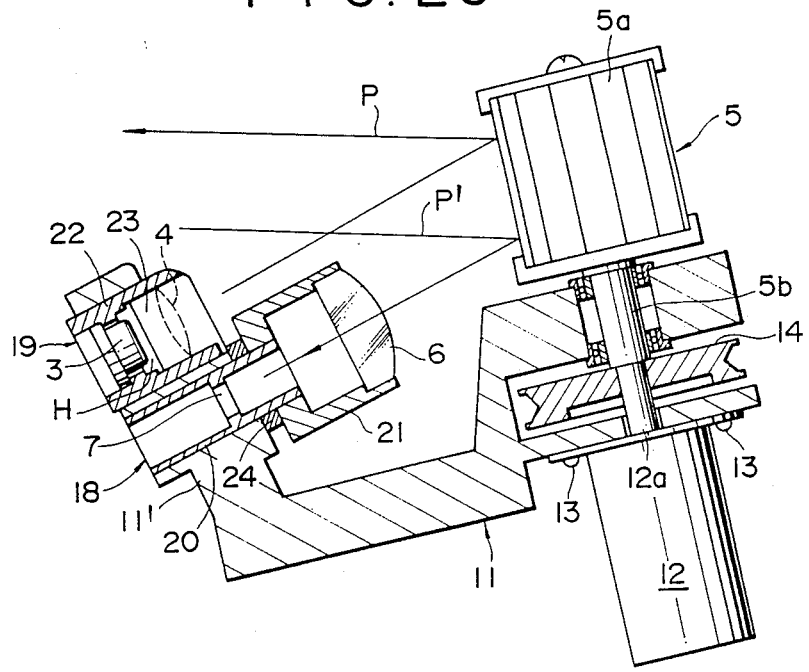

FIGS. 26 through 29 illustrate a seventh embodiment of a scan type oar code reader according to the present invention, in which FIG. 26 illustrate an arrangement thereof. In FIG. 6, the component parts identical with the first embodiment are denoted by identical reference numerals.

Figure 27:
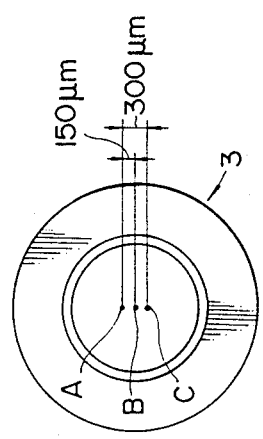
Figure 28:
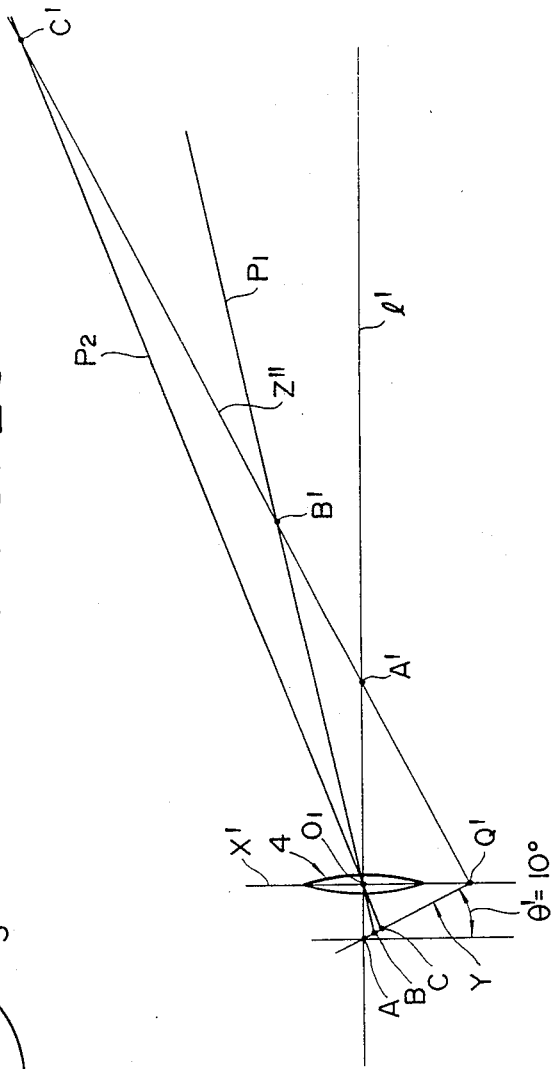

In this seven embodiment, one having a plurality of illuminating points A, B and C is used as the semiconductor laser 3 as shown in FIG. 27. One example of this type of semiconductor laser 3 is a three beam type which is used to write in, read out and erase an information on an optical disk. The distance between the illuminating points A, B, and C is about 150 μm. The semiconductor laser 3, as shown in FIG. 28, is tilted as such that the illuminating points A, B, and C and the projecting lens 4 form a tilt optical system.

That is, the object plane including each illuminating point A, B and C of the semiconductor laser 3 is tilted with respect to the projecting lens 4 and an image plane spacewise tilted with respect to the object plane. If the illuminating point A is established on the optical axis l', an imaging point A' thereof is established on the optical axis l'. In that case if the intersecting point between an extension (line) Y connecting the illuminating points A and B and a vertical line X passing through the principal point of the projecting lens 4 and vertical to the optical axis l' is represented by Q', an imaging point B' of the illuminating point B is present on a straight line Z' connecting the intersecting point Q' and the imaging point A' and is established as the intersecting point of a straight line $P_1$ passing through the center O of the projecting lens 4. Similarly, the imaging point C' of the illuminating point C is also established as the intersecting point between the straight line $P_2$ and the straight line Z'. In general, if the object plane is tilted with respect to the projecting lens 4, the imaging point with respect to the illuminating point on the extension (line) Y is present on the straight line Z' according to Shaiibriff law. Each imaging point A', B' and C' is conjugated with each illuminating point A, B and C, and each imaging point A', B' and C' is a geometric position corresponding to the beam waist of the laser beam P.

Figure 29:
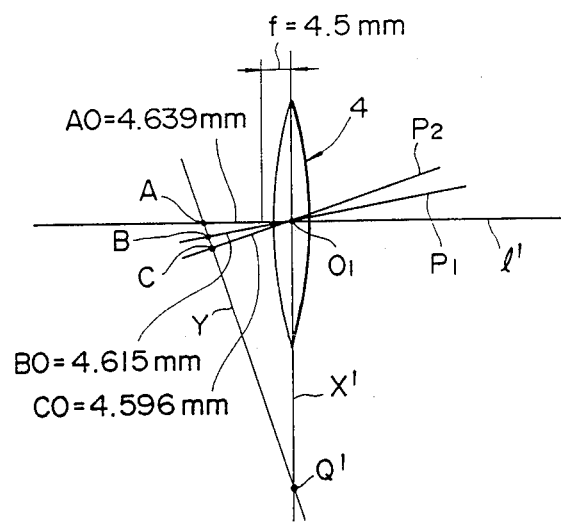

Therefore, if, for example, the focal distance f of the projecting lens 4 is established as F=4.5 mm, the distance $AO_1$ between the illuminating point A and the center $O_1$ is established as 4.639 mm, and the angle θ formed by the extension (line) Y connecting the illuminating points A, B and C with respect to the projecting lens 4 is established as θ'=10° as shown in FIG. 29 in an enlarged scale, the distance $BO_1$ between the illuminating point B and the center $O_1$ becomes 4.615 mm and the distance $CO_1$ between the illuminating point C and the center $O_1$ becomes 4.596 mm, and the distance $O_1A'$ from the center $O_1$ to the imaging point A becomes 150 mm, the distance $O_1B'$ from the center $O_1$ to the imaging point B' becomes 181 mm, and the distance $O_1C'$ from the center $O_1$ to the imaging point C' becomes 215 mm.

If the illuminating point A is illuminated when the subject 8 to be scanned is present at the imaging point A' of the near place, the reading signal S is obtained as shown in FIG. 14A. On the other hand, when the subject 8 to be scanned is present at the imaging points B' and C' of the remote place, the illumination of the illuminating point A makes it possible to obtain only a noise signal NS.

If the semiconductor laser 3 comprises a single illuminating point, the position of the beam waist must be changed by causing the optical member for changing the beam waist position to enter into the optical path M. However, according to this seventh embodiment, the information on the subject 8 presented at the imaging points B' and C' of a remote place can be correctly and easily read by switching the illuminating points A, B and C in turn without using the optical member for changing the beam waist position.

In the seventh embodiment, although the number of the illuminating points of the semiconductor laser 3 is three, it is not limited to three. If the number of the illuminating points is increased, the bar code information can be seccesively correctly and easily read in such a wide range as from the near place to the remote place.

Since the tilting relation between the semiconductor laser 3 and the projecting lens 4 is relative, the projecting lens 4 may be tilted without tilting the semiconductor laser 3. Although the pulley 14 is illustrated in FIG. 26, this can be eliminated.

Figure 30:
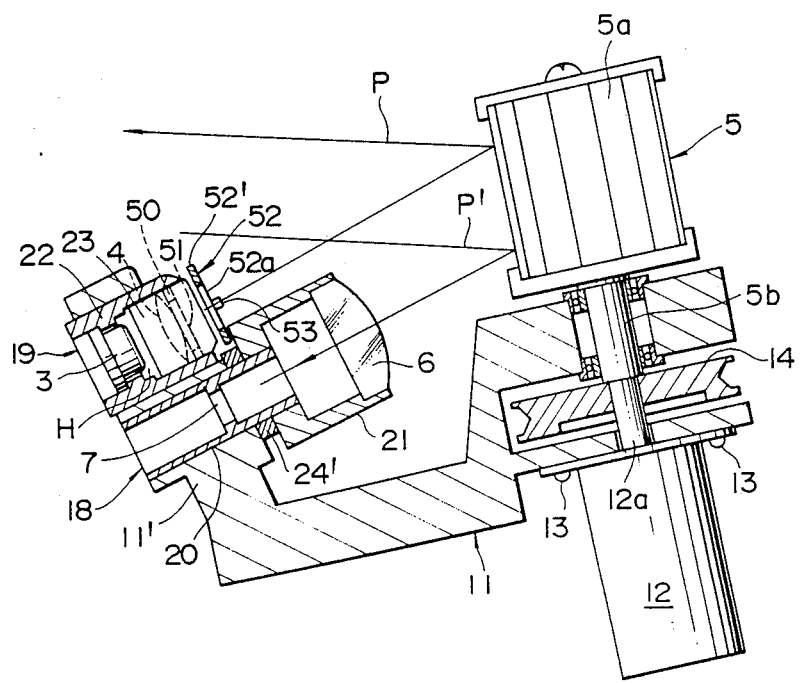
Figure 31:
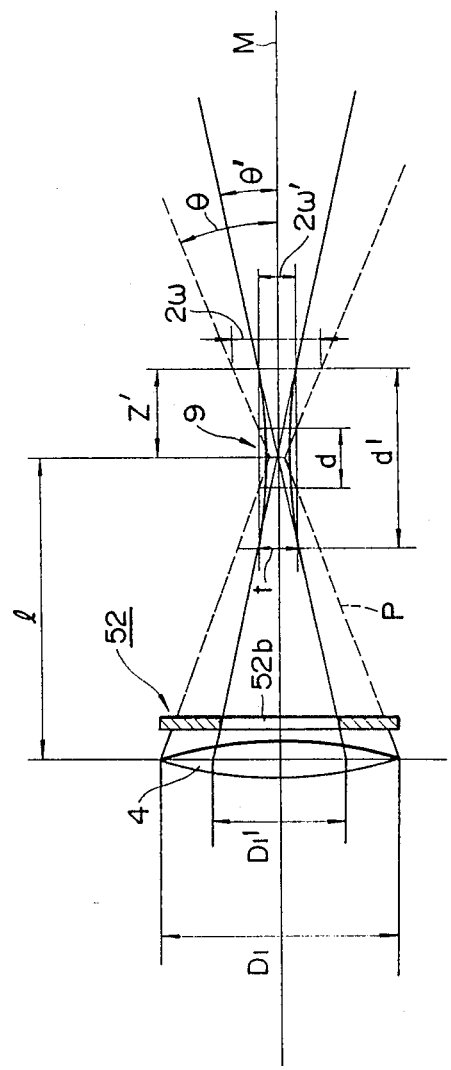
Figure 32:
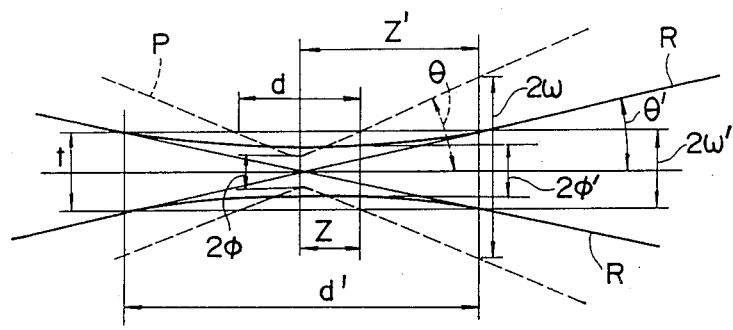

FIGS. 30 through 35 illustrate an eighth embodiment of a scan type bar code reader according to the present invention, in which FIG. 30 illustrates an arrangement thereof. In FIG. 30, the component parts identical with the first embodiment are denoted by identical reference numerals.

In this eighth embodiment, a stationary diaphragm 50 is disposed at an outlet side of the projecting lens 4. 51 denotes an opening of the stationary diaphragm. 24' denotes a spacer. Between the polygon mirror 5 and the projecting lens 4, a diaphragm member 52 is disposed. 53 is a rotary shaft of the diaphragm member 52. The rotary shaft 53 is offset at this side of the drawing. The diaphragm member 52 is provided with a plurality of arcuate openings 52a through 52c as shown in enlarged scale in FIG. 35. The openings 52a through 52c are different in width E in the X' direction corresponding to the scanning direction X cf the laser beam P. The diameter $D_1$ of the opening 51 of the stationary diaphragm 50 is slightly larger than the width e of the opening 52a.

The diaphragm member 52 is formed at the outer peripheral portion thereof with a gear portion 52'. The diaphragm member 52 is rotated in the direction as shown by an arrow F by driving means (not shown). When the opening 52a is brought to be faced with the projecting lens 4, the effective aperture diameter of the projecting lens 4 can be regarded as the same length as the diameter $D_1$ of the opening 51. At this time, the laser beam P advances in the direction as shown by broken line of FIG. 31, and the radius ϕ' of the beam waist 9, as shown in enlarged scale in FIG. 32, becomes as follows;

$$\phi' = (a \cdot \lambda \cdot l)/2D_1 \tag{2}$$

and the radius ω' of the beam diameter 2ω' of the laser beam at a place close to the beam waist 9 by a distance Z is represented by the following relation;

$$\omega'^2 = \phi'^2 + (\lambda \cdot Z/\pi \cdot \phi')^2 \tag{3}$$

wherein π is the ratio of the circumference of a circle to its diameter.

Therefore, if the beam diameter 2ω' of the laser beam P is equal to the minimum bar distance t, the readable range d which can correctly read the bar code information of the subject 8 to be scanned is as follows;

$$d = 2Z \tag{4}$$

wherein the effective aperture diameter of the projecting lens 4 is $D_1$.

And, when the diaphragm member 52 is rotated to bring, for example, the opening 52b to face with the projecting lens 4 and the rotation of the diaphragm member 52 is stopped at the position where the opening 52b faces the projecting lens 4, the effective aperture diameter of the projecting lens 4 in the X' direction corresponding to the scanning direction X becomes to have a size represented by $D_1'$ and the laser beam P advances in the direction as shown by a solid line. And, the radius $\phi$ of the beam waist 9 becomes as follows;

$$\phi = (a \cdot \lambda \cdot l)/2D_1' \qquad (5)$$

although the radius o of the beam waist 9 becomes slightly large compared with the case where the effective diameter of the projecting lens 4 can be regarded as $D_1$, the beam diameter $2\omega$ of the laser beam P at the place sufficiently away from the beam waist 9 by a distance Z approaches to the asymptotic line R can be regarded as a so-called geometric image, because the beam diameter $2\omega$ is linear functionally increased by the distance from the beam waist 9 and the item of $(\phi')^2$ in the formula (3) can be disregarded and, therefore, it can be regarded as an image of geometrical optics. Therefore, the following relation can be obtained;

$$\omega = \theta \cdot Z \qquad (6)$$

wherein $\theta = \lambda/(\pi \cdot \phi)$.

Therefore, if the effective diameter of the projecting lens 4 is denoted by $D_1'$ and the diameter of the beam waist is denoted by $\phi'$ when, for example, the effective aperture diameter of the projecting lens 4 is 80% of the effective aperture diameter $D_1$ of the projecting lens 4 in the geometrical optics area, a relation of $D_1' = 0.8 D_1$ is obtained. Therefore, the following relation is obtained;

$$\phi' = (a \cdot \lambda \cdot l)/(0.8 D_1) = 1.25(a \cdot \lambda \cdot l)/D_1 = 1.25\phi \qquad (7)$$

Therefore, $\phi'$ becomes larger than $\phi$ by 25%.

However, the radius $\omega'$ of the beam diameter $2\omega'$ at a place away from the beam waist 9 by a distance Z' is represented by the following relation;

$$\omega' = \theta' \cdot Z' = (\lambda \cdot Z')/(\pi \cdot \phi') \qquad (8)$$

whereas the effective aperture diameter of the projecting lens 4 is $D_1$, and the distance Z from the beam waist 9 when the beam diameter of the laser beam P becomes the same to $2\omega'$, can be expressed as follows;

$$Z = \omega'/\theta = \omega'/(\lambda/\pi \cdot \theta) \qquad (9)$$

Therefore, the above-mentioned relation (8) can be rewritten with regard to the radius $\omega'$ as follows;

$$\omega = (\lambda \cdot Z)/(\pi \cdot \theta) \qquad (10)$$

If the radius $\omega'$ is moved using this relation (10) and the afore-mentioned relation (8), the following relation can be obtained;

$$(\lambda \cdot Z)/(\pi \cdot \phi) = (\lambda \cdot Z')/(\pi \cdot \phi') \qquad (11)$$

The distances Z and Z' from the beam waist 9 become as follows;

$$Z/\phi = Z'/\phi' \qquad (12)$$

since $\phi' = 1.25\phi$, the following relation is obtained;

$$Z = 1.25 Z' \qquad (13)$$

This relation (13) shows the distance from the beam waist 9 when it has the same beam diameter when the effective aperture diameter of the projecting lens 4 is $D_1'$ and the effective diameter of the projecting lens 4 is not $D_1$.

This means that the readable range d' when the minimum bar distance t of a rough specification bar code is read under the condition that the effective aperture diameter of the projecting lens 4 is $D_1'$, becomes larger by about 1.25 times with respect to the readable range d when the minimum bar distance t of the rough specification bar code is read under the condition that the effective aperture diameter of the projecting lens 4 is D. In this way, the change of the effective aperture diameter of the projecting lens 4 can change the readable range according to the bar code specification.

Figure 33:
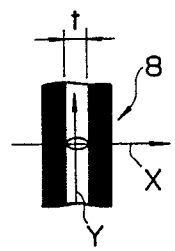

In this embodiment, since the effective aperture diameter of the projecting lens 4 is not changed in the Y' direction corresponding to the Y direction intersecting the scanning direction X at right angles, the beam diameter of the laser beam P in the Y direction intersecting the scanning direction X at right angles has the same length as the beam diameter $2\omega'$ when the effective aperture diameter of the projecting lens 4 is D. As a result, as shown in FIG. 33, the beam diameter on the subject 8 to be scanned becomes to have an elliptical shape at the beam waist; the beam diameter in the direction corresponding to the scanning direction X becomes to have an elliptical shape of $2\omega$, while the beam diameter in the direction intersecting the scanning direction X at right angles becomes to have an elliptical of $2\omega'$. This means that the radiation intensity becomes generally the same in the Y direction whether or not the diaphragm member 52 is provided. Therefore, a larger radiation intensity can be obtained than that when the effective aperture diameters of the projecting lens is changed both in the X' and Y' directions. Thus, the reflecting intensity of the return beam caused by the reflection of the laser beam can be restricted to become weak as much as possible.

Figure 34:
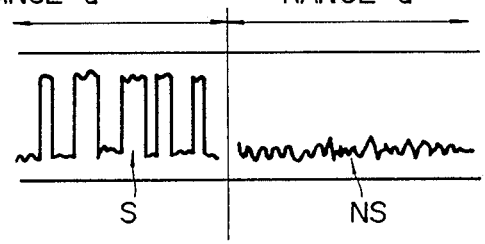
Figure 35:
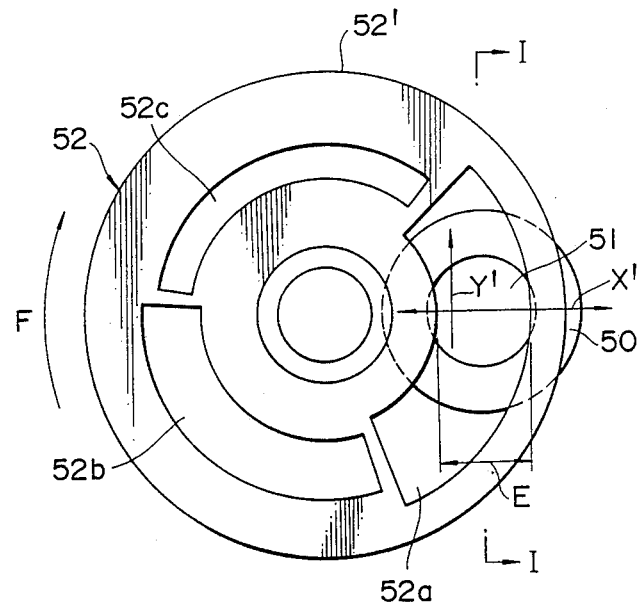

Therefore, in order to scan the subject 8 having a fine specification bar code, the opening 52a of the diaphragm member 52 is faced with the projecting lens 4 and the subject 8 having the fine specification bar code is scanned. When the subject 8 is within the readable range d, a normal reading signal S is obtained as shown in FIG. 34. When the subject 8 is out of the readable range d, as the distance Z from the beam waist 9 of the subject 8 to be scanned becomes large, the beam diameter $2\omega'$ becomes suddenly large which makes it difficult to read the bar code correctly. In the long run, only the noise signal NS occurs. On the other hand, when any one of the openings 52b and 52c of the diaphragm member 52 is faced with the projecting lens 4 in order to scan the subject 8 having a rough specification bar code, the readable range d" becomes deep. Therefore, even if the distance from the projecting lens 4 to the subject 8 is slightly fluctuated, a correct reading signal S can be obtained.

Figure 36:
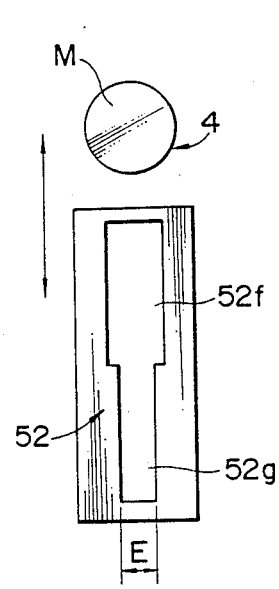

FIG. 36 illustrates a first modified embodiment of a diaphragm member 52 according to this eighth embodiment, in which the diaphragm member 52 is moved forward and backward in the vertical direction with respect to the optical axis of the optical path M, and rectangular openings 52f and 52g having a different width E in the X' direction corresponding to the scanning direction X are formed in the diaphragm member 52 to change the readable range in three stages.

Figure 37:
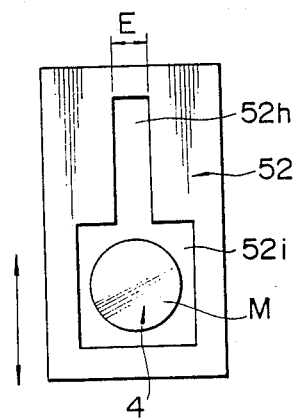

FIG. 37 illustrates a second modified embodiment of the diaphragm member 52 according to this eighth embodiment, in which the diaphragm member 52 is moved forward and backward in the vertical direction with respect to the optical axis of the optical path M, and a regular square opening 52i having an area larger than the effective aperture diameter of the projecting lens 4 and an opening 29h having a narrow width in the X' direction corresponding to the scanning direction are formed in the diaphragm 52 to change the readable range in two stages.

In this eighth embodiment, the lens barrel 23 is provided with a stationary diaphragm 50. However, this stationary diaphragm 50 can be eliminated.

Figure 38:
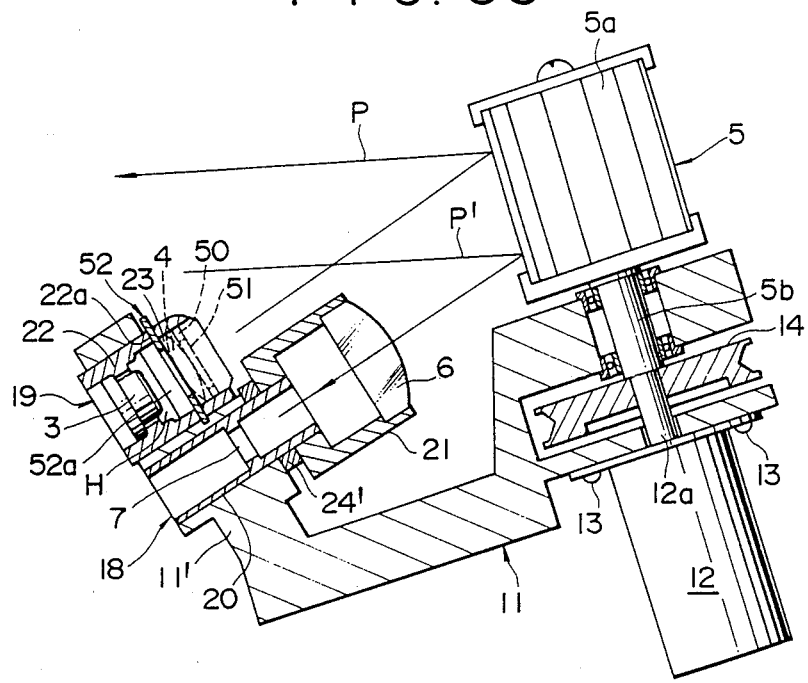
Figure 39:
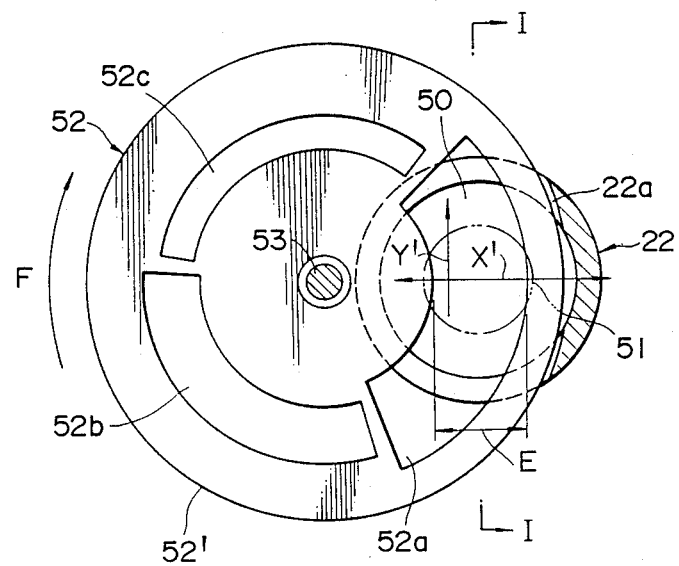

FIGS. 38 and 39 illustrate a ninth embodiment of a scan type bar code reader according to the present invention, in which the diaphragm member 52 is arranged as such that an opening of the diaphragm 52 can enter between the semiconductor laser 3 and the projecting lens 4. As shown in FIG. 39, the holding barrel 22 is formed in the peripheral wall thereof with a slit groove 22a. The slit groove 22a extends in the peripheral direction of the holding barrel 25 and a part of the diaphragm member 52 enters into the holding barrel 22 through the slit groove 22a. Since the remaining structure is about the same as that of the eighth embodiment, the identical component parts are denoted by identical reference numerals and the detailed description will be omitted.

Figure 40:
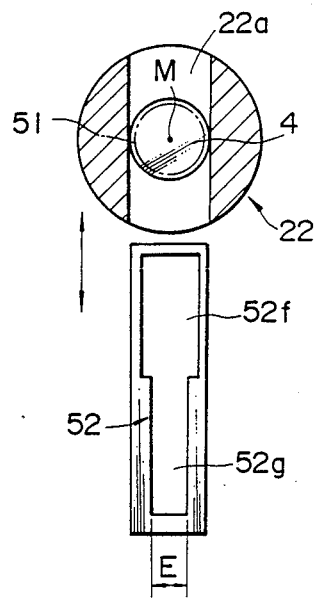
Figure 41:
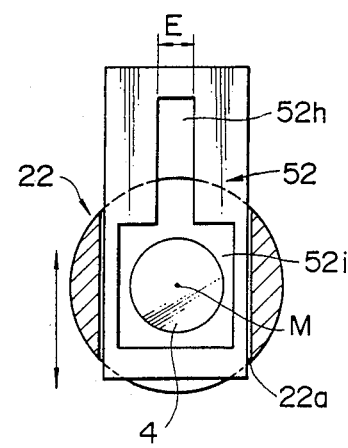

FIGS. 40 and 41 illustrate a first and a second modified embodiments of the ninth embodiment respectively. Since these modified embodiments are about the same as the first and the second modified embodiments of the eighth embodiment, identical component parts are denoted by identical reference numerals and the detailed description will be omitted.

It will be appreciated that various modifications and changes of the preferred embodiments, some of which have been described above, may be made without departing from the scope of the present invention as defined in the accompanying claims.

What is claimed is:

1. A scan optical reader comprising:
a laser source;
an optical deflecting member for deflecting a laser beam emitted from said laser source and for projecting the laser beam to a subject to be scanned;
a projecting lens disposed between said laser source and said optical deflecting member;
a light receiving device for receiving the laser beam reflected by the subject to be scanned in order to read information on said subject;
a plane parallel plate for changing a beam waist position of the laser beam with respect to said projecting lens, disposed between said laser source and said projecting lens; and
means for moving said plane parallel plate into and out of an optical path of the laser beam.

2. A scan optical reader comprising:
a laser source;
an optical deflecting member for deflecting a laser beam emitted from said laser source and for projecting the laser beam to a subject to be scanned;
a projecting lens disposed between said laser source and said optical deflecting member;
a light receiving device for receiving the laser beam reflected by the subject to be scanned in order to read information on said subject;
plural plane parallel plates, each plate having a different thickness, for changing a beam waist position of the laser beam with respect to said projecting lens disposed between said laser source and said projecting lens; and
means for moving said plane parallel plate into and out of an optical path of the laser beam.

3. A scan type optical reader according to claim 2, wherein each of said plane parallel plates has a different refractive index.

4. A scan type optical reader according to either of claims 2 and 3, wherein the subject to be scanned is a bar code.

5. A scan type optical reader according to either of claims 2 and 3, further comprising a rotary supporting member and wherein said plural plane parallel plates are supported by said rotary supporting member, and wherein said means for moving said plural plane parallel plates rotates said rotary member.

6. A scan optical reader comprising:
a laser source;
an optical deflecting member for deflecting a laser beam emitted from said laser source and for projecting the laser beam to a subject to be scanned;
a projecting lens disposed between said laser source and said optical deflecting member;
a light receiving device for receiving the laser beam reflected by the subject to be scanned in order to read information on said subject;
a wedge-shaped optical member for changing a beam waist position of the laser beam with respect to said projecting lens disposed between said laser source and said projecting lens; and
means for moving said plane parallel plate into and out of an optical path of the laser beam.

7. A scan optical reader comprising:
a laser source;
a deflecting optical member for deflecting a laser beam emitted from said laser source and for projecting the laser beam to a subject to be scanned;
a projecting lens disposed between said laser source and said optical deflecting member;
a light receiving device for receiving the laser beam reflected by the subject to be scanned in order to read information on the subject;
plural wedge-shaped optical members, each being of a different thickness, for changing a beam waist position with respect to said projecting lens, disposed between said laser source and said projecting lens; and
means for moving said wedge shaped optical members into and out of an optical path of the laser beam.

8. A scan type optical reader as claimed in 7, wherein each of said wedge-shaped optical members has a different refractive index.

9. A scan type optical reader according to either of claims 7 and 8, wherein the subject to be scanned is a bar code.

10. A scan type optical reader according to either of claims 7 and 8, further comprising a rotary supporting member and wherein said plural wedge-shaped optical members are supported by said rotary supporting member, and wherein said means for moving said wedge shaped optical members rotates said rotary member.

11. A scan type bar code reader comprising:
a semiconductor laser;
an optical deflecting member for deflecting a laser beam emitted from said laser source and for projecting the laser beam to a bar code to be scanned;
a projecting lens disposed between said semiconductor laser beam and said optical deflecting member;
a light receiving device for receiving the laser beam reflected by the subject to be scanned in order to read information on said bar code;
plural plane parallel plates for changing a beam waist position of the laser beam with respect to said projecting lens, disposed between said semiconductor laser and said projecting lens, each of said plural plane parallel plates having a different thickness;
a rotary supporting member for supporting said plane parallel plates; and
means rotating said rotary member for thereby moving said plural plane parallel plates into an optical path of the laser beam;
wherein said laser beam emitted through said projecting lens being in the general shape of an ellipse, whereby an elongated direction of the ellipse is in accordance with the radial direction of said rotary supporting member, and whereby said semiconductor laser is disposed so that said elongated direction of said ellipse has a spreading angle which is in accordance with the scanning direction of the bar code to be scanned.

12. A scan type bar code reader according to claim 11, wherein each plane parallel plate has a different refractive index.

13. A scan type bar code reader comprising:
a semiconductor laser;
an optical deflecting member for deflecting a laser beam emitted from said laser source and for projecting the laser beam to a bar code to be scanned;
a projecting lens disposed between said semiconductor laser and said optical deflecting member;
a light receiving device for receiving the laser beam reflected by said bar code to be scanned in order to read information on said bar code;
plural plane parallel plates for changing a beam waist position of the laser beam with respect to said projecting lens disposed between said semiconductor laser and said projecting lens, each of said plural plane parallel plates having a different thickness;
a rotary supporting member for supporting said plane parallel plates; and
means for rotating said rotary member for thereby moving said parallel plates into an optical path of the laser beam and for moving said plane parallel plates out of said optical path of the laser beam;
wherein said laser beam emitted through said projecting lens being in the general shape of an ellipse, whereby an elongated direction of the ellipse is in accordance with the radial direction of said rotary supporting member, and whereby said semiconductor laser is disposed so that said elongated direction of said ellipse has a spreading angle which is in accordance with the scanning direction of the bar code to be scanned.

14. A scan type bar code reader according to claim 13 wherein each of said plural plane parallel plates has a different refractive index.

15. A scan type bar code reader comprising:
a semiconductor laser;
an optical deflecting member for deflecting a laser beam emitted from said semiconductor laser and for projecting the laser beam to a bar code to be scanned, thereby forming a laser beam spot on the bar code in the shape of an oval, said oval having an elongated direction which is the same as the long direction of bars of said bar code;
a projecting lens disposed between said semiconductor laser and said optical deflecting member;
a light receiving device for receiving the laser beam reflected by said bar code to be scanned in order to read information on the bar code;
a cylindrical plane plate having a wedge shape in section for changing a beam waist position with respect to said projecting lens disposed between said semiconductor laser and said projecting lens; and
means for rotating said cylindrical optical plate so that the thickness of the cylindrical optical plate in an optical path of said laser beam will vary.

16. A scan type bar code reader comprising:
a semiconductor laser;
an optical deflecting member for deflecting a laser beam emitted from said laser source and for projecting the laser beam to a bar code to be scanned;
a projecting lens disposed between said semiconductor laser and said optical deflecting member;
a light receiving device for receiving the laser beam reflected by said bar code to be scanned in order to read information on said bar code;
a wedge-shaped optical member for changing a beam waist position with respect to said projecting lens disposed between said projecting lens and each optical deflecting member;
said wedge-shaped optical member being constructed as a cylindrical optical member having a wedge shape in section; and
means rotating said wedge-shaped optical member so that the thickness of said wedge-shaped optical member in an optical path of the laser beam will vary, said laser beam producing a spot on the bar code in the general shape of an oval having an elongated direction substantially the same as the long direction of bars of said bar code.

17. A scan type bar code reader comprising:
a semiconductor laser;
an optical deflecting member for deflecting a laser beam emitted from said laser and for projecting the laser beam to a bar code to be scanned;
a projecting lens disposed between said semiconductor laser and said optical deflecting member;
a light receiving device for receiving the laser beam reflected by the subject to be scanned in order to read information on said bar code;
a diaphragm member for changing a readable range, disposed between said semiconductor laser and said projecting lens; and
means for moving said diaphragm member into an optical path of the laser beam and for moving said diaphragm out of an optical path of the laser beam.

18. A scan type bar code reader according to claim 17, wherein said diaphragm member changes the effective aperture diameter of said projecting lens in the direction corresponding to the scanning direction of the laser beam.

19. A scan type bar code reader comprising:
a semiconductor laser;

an optical deflecting member for deflecting a laser beam emitted from said laser source and for projecting the laser beam to a bar code to be scanned;

a projecting lens disposed between said semiconductor laser and said optical deflecting member;

a light receiving device for receiving the laser beam reflected by said bar code to be scanned in order to read information on said bar code;

a diaphragm member for changing a readable range, disposed between said projecting lens and said deflecting optical member; and means for moving said diaphragm member into an optical path of the laser beam and for moving said diaphragm out of said optical path of the laser beam.

20. A scan type bar code reader according to claim 19, wherein said diaphragm member changes the effective aperture diameter of said projecting lens in the direction corresponding to the scanning direction of the laser beam.

21. A scan type bar code reader comprising:

a semiconductor laser;

an optical deflecting member for deflecting a laser beam emitted from said semiconductor laser and for projecting the laser beam to a bar code to be scanned;

a projecting lens disposed between said semiconductor laser and said optical deflecting member;

a light receiving device for receiving the laser beam reflected by said bar code to be scanned in order to read information on said bar code;

a cylindrical lens for changing a beam waist position of the laser beam with respect to said projecting lens disposed between said projecting lens and said deflecting optical member; and means for moving said cylindrical lens into an optical path of the laser beam and for moving said cylindrical lens out of the optical path of the laser beam, wherein said cylindrical lens has a power which corresponds to a scanning direction.

22. A scan type optical reader comprising:

a laser source;

an optical deflecting member for defecting a laser beam emitted from said laser source and for projecting the laser beam to a subject to be scanned;

a projecting lens disposed between said laser source and said optical deflecting member;

a light receiving device for receiving the laser beam reflected by the subject to be scanned in order to read information on said subject;

means for changing a beam waist position of the laser beam with respect to said projecting lens, disposed between said laser source and said optical deflecting member; and means for moving said means for changing a beam waist position into and out of the optical path of the laser beam.

* * * * *

UNITED STATES PATENT AND TRADEMARK OFFICE
CERTIFICATE OF CORRECTION

PATENT NO. : 4,916,318

DATED : April 10, 1990

INVENTOR(S) : M. IIMA

It is certified that error appears in the above-identified patent and that said Letters Patent is hereby corrected as shown below:

```
Column 3, line 40, change "0" to ---9---.
Column 4, line 3, change "K" to ---K₁---.
Column 4, line 23, change "K" to ---K₁---.
Column 4, line 25, before "3" insert ---laser---.
Column 4, line 30, change "K" to ---K₁---.
Column 4, line 35, after "direction" insert ---,---.
Column 4, line 63, change "sintering" to ---entering---.
Column 5, line 15, change "t" to ---to---.
Column 7, line 2, after "to" insert ---an---.
Column 8, line 1, before "engaging" change "a" to ---an---.
Column 8, lines 11/12, change "opening" to ---openings---
Column 8, line 65, before "3" insert ---laser---.
Column 8, line 68, change "2" to ---2♦---.
Column 9, line 3, change "as" to ---at---.
Column 9, line 9, change "parallel)" to ---parallel---.
Column 10, line 14, change "forms" to ---form---.
Column 10, line 32, change "as" to ---at---.
Column 10, line 34, change "cf" to ---of---.
Column 10, line 68, after "44" insert ---,---.
Column 11, line 1, after "position" insert ---,---.
Column 11, line 4, change "M" to ---P--- after "beam".
Column 11, line 12, change "2" to ---2♦---.
Column 11, line 13, change "1" to ---L---.
Column 11, line 44, change "rotor" to ---rotary---.
Column 12, line 3, change "cf" to ---of---.
Column 12, line 52, change "28a" to ---28A---.
Column 12, line 66, change "oar" to ---bar---.
Column 12, line 67, change "illustrate" to ---illustrates---.
Column 12, line 68, change "6" to ---26---.
Column 13, line 3, change "seven" to ---seventh---.
```

UNITED STATES PATENT AND TRADEMARK OFFICE
CERTIFICATE OF CORRECTION

PATENT NO. : 4,916,318

DATED : April 10, 1990

INVENTOR(S) : M. IIMA

It is certified that error appears in the above-identified patent and that said Letters Patent is hereby corrected as shown below:

Column 13, line 7, after "erase" delete "an".
Column 13, line 15, after "respect" insert ---to---.
Column 13, line 19, after "case" insert ---,---.
Column 13, line 40, change "F" to ---f---.
Column 13, line 50, change "A" to ---A'---.
Column 14, line 33, change "cf" to ---of---.
Column 14, line 35, change "e" to ---E---.
Column 14, line 44, after "by" insert ---the---.
Column 15, line 12, change "o" to ---$\phi$---.
Column 15, line 31, after "for" delete ".".
Column 15, line 52, change equation (9) to read --- $Z=b'/\theta=b'/(\lambda/\pi\cdot\phi))$---.
Column 15, line 56, change equation (10) to read --- $b=(\lambda\cdot Z)/(\pi\cdot\phi)$---.
Column 16, line 3, change "1.25Z'" to ---1.25Z---.
Column 16, line 35, after "elliptical" insert ---shape---.
Column 16, line 60, change "d"" to ---d---.
Column 17, line 27, change "25" to ---22---.
Column 17, line 48 (claim 1, line 1), insert ---type--- after "scan".
Column 17, line 64 (claim 2, line 1), insert ---type--- after "scan".
Column 18, line 25 (claim 6, line 1), insert ---type--- after "scan".
Column 18, line 41 (claim 7, line 1), insert ---type--- after "scan".
Column 19, line 20 (claim 11, line 18), insert ---for--- after "means".

UNITED STATES PATENT AND TRADEMARK OFFICE
CERTIFICATE OF CORRECTION

PATENT NO. : 4,916,318

DATED : April 10, 1990

INVENTOR(S) : M. IIMA

It is certified that error appears in the above-identified patent and that said Letters Patent is hereby corrected as shown below:

Column 10, line 39 (claim 16, line 18), insert ---for--- after "means".

Signed and Sealed this

Twenty-third Day of February, 1993

Attest:

STEPHEN G. KUNIN

*Attesting Officer*  *Acting Commissioner of Patents and Trademarks*